United States Patent
Doig et al.

(10) Patent No.: US 10,885,781 B2
(45) Date of Patent: Jan. 5, 2021

(54) METHOD AND SYSTEM FOR A PROXY VEHICULAR INTELLIGENT TRANSPORTATION SYSTEM STATION

(71) Applicant: BlackBerry Limited, Waterloo (CA)

(72) Inventors: Ian Christopher Drummond Doig, Roquefort les Pins (FR); Stephen John Barrett, Haywards Heath (GB); Nicholas Patrick Alfano, Vancouver (CA); James Randolph Winter Lepp, Ottawa (CA); Roland Emlyn Williams, San Ramon, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/714,630

(22) Filed: Sep. 25, 2017

(65) Prior Publication Data
US 2019/0096243 A1 Mar. 28, 2019

(51) Int. Cl.
G08G 1/09 (2006.01)
H04L 29/08 (2006.01)
H04W 84/04 (2009.01)

(52) U.S. Cl.
CPC ............ *G08G 1/091* (2013.01); *G08G 1/09* (2013.01); *H04L 67/12* (2013.01); *H04W 84/042* (2013.01)

(58) Field of Classification Search
CPC ...... G08G 1/091; H04L 67/12; H04W 84/042
USPC ........................................................ 340/905
See application file for complete search history.

(56) References Cited

U.S. PATENT DOCUMENTS

| | | | |
|---|---|---|---|
| 8,930,041 B1* | 1/2015 | Grimm | G07C 5/008 370/338 |
| 9,650,007 B1* | 5/2017 | Snyder | B60R 21/0132 |
| 9,773,281 B1* | 9/2017 | Hanson | G06Q 40/08 |
| 9,811,085 B1* | 11/2017 | Hayes | G08G 1/0112 |
| 10,013,881 B2* | 7/2018 | Miller | G08G 1/162 |
| 10,104,525 B1* | 10/2018 | Kaiser | H04B 5/0031 |
| 2009/0224931 A1 | 9/2009 | Dietz | |
| 2013/0150004 A1 | 6/2013 | Rosen | |
| 2013/0325305 A1 | 12/2013 | Foti | |
| 2014/0200760 A1* | 7/2014 | Kaufmann | G07C 5/008 701/29.3 |
| 2014/0256303 A1 | 9/2014 | Jones | |
| 2015/0237561 A1* | 8/2015 | Stahlin | H04L 69/32 370/338 |

(Continued)

FOREIGN PATENT DOCUMENTS

WO 2017/010632 1/2017

OTHER PUBLICATIONS

European Telecommunications Standards Institute (ETSI), European Standard (EN) 302 665, "Intelligent Transport Systems (ITS): communications architecture", Version 1.1.1, Sep. 2010 ((44 pages).

(Continued)

*Primary Examiner* — Kam Wan Ma
(74) *Attorney, Agent, or Firm* — Trop, Pruner & Hu, P.C.

(57) ABSTRACT

A method at a computing device for the computing device to act as an intelligent transportation system (ITS) station for a vehicle, the method including detecting that the computing device is proximate to the vehicle; determining whether ITS messages are being sent on behalf of the vehicle; and if the determining finds ITS messages are not being sent on behalf of the vehicle, the computing device acting as the ITS station for the vehicle.

18 Claims, 12 Drawing Sheets

(56) References Cited

U.S. PATENT DOCUMENTS

| | | | | |
|---|---|---|---|---|
| 2015/0381751 | A1* | 12/2015 | Haran | H04L 67/28 |
| | | | | 709/217 |
| 2016/0295401 | A1* | 10/2016 | Berge | H04W 12/02 |
| 2016/0377725 | A1* | 12/2016 | Van Roermund | G01S 19/05 |
| | | | | 342/357.42 |
| 2017/0025017 | A1* | 1/2017 | Thomas | G06K 9/00798 |
| 2017/0032402 | A1* | 2/2017 | Patsiokas | G06Q 30/0266 |
| 2017/0048080 | A1* | 2/2017 | Grimm | H04L 12/40032 |
| 2017/0215056 | A1* | 7/2017 | Edge | H04W 4/90 |
| 2017/0280378 | A1* | 9/2017 | Atarius | H04L 12/18 |
| 2017/0330456 | A1* | 11/2017 | Miller | G08G 1/0112 |
| 2017/0374642 | A1* | 12/2017 | Lee | H04W 12/08 |
| 2018/0192266 | A1* | 7/2018 | Park | H02J 7/02 |
| 2018/0227155 | A1* | 8/2018 | Khoryaev | H04L 27/2602 |
| 2018/0234898 | A1* | 8/2018 | Kahtava | H04W 16/14 |
| 2018/0262865 | A1* | 9/2018 | Lepp | H04W 4/80 |
| 2018/0279201 | A1* | 9/2018 | Pandya | H04W 76/10 |

OTHER PUBLICATIONS

European Telecommunications Standards Institute (ETSI), Technical Report (TR) 102 863, "Intelligent Transport Systems (ITS); vehicular communications; basic set of applications; local dynamic map (LDM); rationale for a guidance on standardization", Version 1.1.1, Jun. 2011 (40 pages).

European Telecommunications Standards Institute (ETSI), European Standard (EN) 302 637-2, "Intelligent Transport Systems (ITS); Vehicular Communications; Basic Set of Applications; Part 2: Specification of Cooperative Awareness Basic Service", Version 1.3.1, Sep. 2014 (44 pages).

European Telecommunications Standards Institute (ETSI), European Standard (EN) 302 637-3, "Intelligent Transport Systems (ITS); Vehicular Communications; Basic Set of Applications; Part 3: Specifications of Decentralized Environmental Notification Basic Service", Version 1.2.2, Nov. 2014 (73 pages).

European Telecommunications Standards Institute (ETSI), TS 102 894-2, "Intelligent Transport Systems (ITS); Users and applications requirements; Part 2: Applications and facilities layer common data dictionary", Version 1.2.1, Sep. 2014 (94 pages).

European Telecommunications Standards Institute (ETSI), TS 102 965, "Intelligent Transport Systems (ITS); Application Object Identifier (ITS-AID); Registration", Version 1.2.1, Jun. 2015 (8 pages).

Roger Berg, Denso International America, presentation at SEMA 2011, "Connected Vehicle Technology: Improving Safety, Efficiency and the Environmental Impact", slides accessible online at http://slideplayer.com/slide/3327218/, 2011 (10 pages).

Emma Boyle, Techradar, "Ford SmartLink is teaching old cars new connected tricks", Jan. 27, 2017, available online at http://www.techradar.com/news/ford-smartlink-is-teaching-old-cars-new-connected-tricks , Jan. 27, 2017 (10 pages).

European Patent Office, Invitation to Pay Additional Fees and Annex to Form PCT/ISA/208 Communication Relating to the Results of the Partial International Search for Appl. No. PCT/US2018/051878 dated Jan. 17, 2019 (19 pages).

European Patent Office, International Search Report for Appl. No. PCT/US2018/051878 dated Mar. 25, 2019 (21 pages).

\* cited by examiner

METHOD AND SYSTEM FOR A PROXY VEHICULAR INTELLIGENT TRANSPORTATION SYSTEM STATION

FIELD OF THE DISCLOSURE

The present disclosure relates to intelligent transport systems and in particular relates to intelligent transport systems having legacy elements.

BACKGROUND

Intelligent Transport Systems (ITS) are systems in which a plurality of devices communicate to allow for the transportation system to make better informed decisions with regard to transportation and traffic management, as well as allowing for safer and more coordinated decision-making. ITS system components may be provided within vehicles, as part of the fixed infrastructure, such as on bridges or at intersections, and for other users of the transportation systems including pedestrians or bicyclists.

ITS system deployment is receiving significant focus in many markets around the world, with radiofrequency bands being allocated for the communications. In addition to the vehicle to vehicle communications for safety critical and non-critical applications, further enhancements to provide systems or applications are being developed for vehicle to infrastructure and vehicle to portable scenarios.

However, on the rollout of ITS systems, many vehicles currently on the road will not have any ITS capabilities. Such legacy vehicles may have a long lifespan. It may therefore be expected that even after ITS systems are rolled out, for the next 20 years or beyond, many vehicles will be on the road with limited or no ITS capabilities. Hence, vehicles equipped with ITS systems will be sharing roads with legacy non-ITS enabled vehicles for many years.

BRIEF DESCRIPTION OF THE DRAWINGS

The present disclosure will be better understood with reference to the drawings, in which.

DETAILED DESCRIPTION OF THE DRAWINGS

Figure 1:
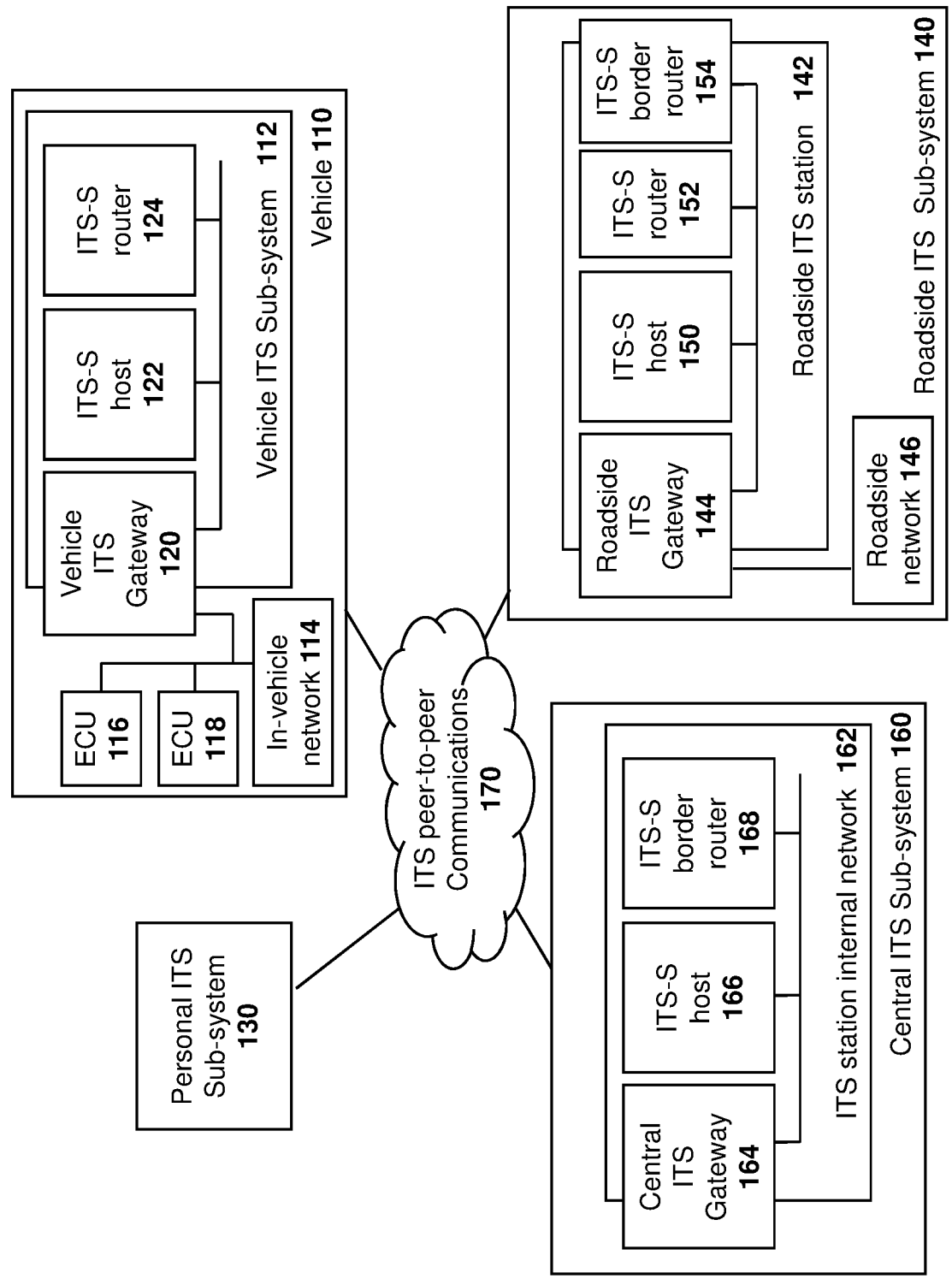
FIG. 1 is a block diagram of an intelligent transportation system.

The present disclosure provides a method at a computing device for the computing device to act as an intelligent transportation system (ITS) station for a vehicle, the method comprising: detecting that the computing device is proximate to the vehicle; determining whether ITS messages are being sent on behalf of the vehicle; and if the determining finds ITS messages are not being sent on behalf of the vehicle, the computing device acting as the ITS station for the vehicle.

The present disclosure further provides a computing device configured to act as an intelligent transportation system (ITS) station for a vehicle, the computing device comprising: a processor; and a communications subsystem, wherein the computing device is configured to: detect that the computing device is proximate to the vehicle; determine whether ITS messages are being sent on behalf of the vehicle; and if the determining finds ITS messages are not being sent on behalf of the vehicle, the computing device being configured to act as the ITS station for the vehicle.

The present disclosure further provides a computer readable medium for storing instruction code for a computing device to act as an intelligent transportation system (ITS) station for a vehicle, the instruction code, when executed by a processor of the computing device, causing the computing device to: detect that the computing device is proximate to the vehicle; determine whether ITS messages are being sent on behalf of the vehicle; and if the determining finds ITS messages are not being sent on behalf of the vehicle, the computing device being configured to act as the ITS station for the vehicle.

In the embodiments described below, the following terminology may have the following meaning, as provided in Table 1.

TABLE 1

Terminology

| Term | Brief Description |
| --- | --- |
| ITS Station | A communication device associated with the ITS system. An ITS station may for example be associated with a car, truck, motorcycle, cyclist, pedestrian, animal, roadside unit. |
| Non-V2X enabled vehicle | A Vehicle without factory fitted V2X capability |
| Road Side Unit | A fixed ITS Station (e.g. which might typically be housed in a traffic light or electronic speed restriction signal) |
| V2X capable vehicle | A vehicular ITS Station |
| Platoon | A group of vehicles that travels in close proximity to one another, nose-to-tail, at highway speeds. A lead vehicle is followed by a number of other vehicles that closely match their speed and maneuvers to the lead vehicle. |
| Proxy ITS station | Mobile or portable device operating as an ITS station on behalf of a road user (that for example does not have in built ITS station capability) |
| Mobile device | The device is a Smart phone or a portable device assumed to have communication capabilities that enable it to engage in V2X communications (e.g. having data enabled 3GPP cellular with V2X |

TABLE 1-continued

Terminology

| Term | Brief Description |
|---|---|
| | capabilities as available in 3GPP Rel 14 and later releases). Mobile devices such as smartphones might typically be expected to have such functionality so that they can interact with the ITS system as a pedestrian. The mobile device may be an aftermarket device (e.g. bespoke portable computer etc.). The mobile device has the functionality to operate as a Proxy ITS station. |

Intelligent Transportation System software and communication systems are designed to enhance road safety and road traffic efficiency. Such systems include vehicle to/from vehicle (V2V) communications, vehicle to/from infrastructure (V2I) communications, vehicle to/from network (V2N) communications, and vehicle to/from the pedestrian or portable (V2P) communications. The communications from a vehicle to/from any of the above may be generally referred to as V2X. Further, other elements may communicate with each other. Thus, systems may include portable to/from infrastructure (P2I) communications, infrastructure to infrastructure (I2I) communications, portable to portable (P2P) communications, among others.

Such communications allow the components of the transportation system to communicate with each other. For example, vehicles on a highway may communicate with each other, allowing a first vehicle to send a message to one or more other vehicles to indicate that it is braking, thereby allowing vehicles to follow each other more closely.

Communications may further allow for potential collision detection and allow a vehicle with such a device to take action to avoid a collision, such as braking or swerving. For example, an active safety system on a vehicle may take input from sensors such as cameras, radar, LIDAR, and V2X, and may act on them by steering or braking, overriding or augmenting the actions of the human driver. Another type of advanced driver assistance system (ADAS) is a passive safety system that provides warning signals to a human driver to take actions. Both active and passive safety ADAS systems may take input from V2X and ITS systems.

In other cases, fixed infrastructure may give an alert to approaching vehicles that they are about to enter a dangerous intersection or alert vehicles to other vehicles or pedestrians approaching the intersection. This alert can include the state of signals at the intersection (signal phase and timing (SPaT)) as well as position of vehicles or pedestrians or hazards in the intersection. Other examples of ITS communications would be known to those skilled in the art.

Reference is now made to FIG. 1, which shows one example of an ITS station, as described in the European Telecommunications Standards Institute (ETSI) European Standard (EN) 302665, "Intelligent Transport Systems (ITS); communications architecture", as for example provided for in version 1.1.1, September 2010.

In the embodiment of FIG. 1, a vehicle 110 includes a vehicle ITS sub-system 112. Vehicle ITS sub-system 112 may, in some cases, communicate with an in-vehicle network 114. The in-vehicle network 114 may receive inputs from various electronic control unit (ECUs) 116 or 118 in the environment of FIG. 1.

Vehicle ITS sub-system 112 may include a vehicle ITS-S gateway 120 which provides functionality to connect to the in-vehicle network 114.

Vehicle ITS sub-system 112 may further have an ITS host 122 which contains ITS applications and functionality needed for such ITS applications.

Further, an ITS-S router 124 provides the functionality to interconnect different ITS protocol stacks, for example at layer 3. ITS-S router 124 may be capable of converting protocols, for example for the ITS-S host 122.

Further, the ITS system of FIG. 1 may include a personal ITS sub-system 130, which may provide application and communication functionalities of ITS communications (ITSC) in handheld or portable devices, such as personal digital assistants (PDAs) mobile phones, user equipment, among other such devices.

A further component of the ITS system shown in the example of FIG. 1 includes a roadside ITS sub-system 140, which may contain roadside ITS stations and interceptors such as on bridges, traffic lights, among other options.

The roadside sub-system 140 includes a roadside ITS station 142 which includes a roadside ITS gateway 144. Such gateway may connect the roadside ITS station 142 with proprietary roadside networks 146.

A roadside ITS station may further include an ITS-S host 150 which contains ITS-S applications and the functionalities needed for such applications.

The roadside ITS station 142 may further include an ITS-S router 152, which provides the interconnection of different ITS protocol stacks, for example at layer 3.

The ITS station 142 may further include an ITS-S border router 154, which may provide for the interconnection of two protocol stacks, but in this case with an external network.

A further component of the ITS system in the example of FIG. 1 includes a central ITS sub-system 160 which includes a central ITS station internal network 162.

Central ITS station internal network 162 includes a central ITS gateway 164, a central ITS-S host 166 and a ITS-S border router 168. Gateway 164, central ITS-S host 166 and ITS border router 168 have similar functionality to the gateway 144, ITS host 150 and ITS-S border router 154 of the roadside ITS station 142.

Communications between the various components may occur through a ITS peer-to-peer communications network 170.

With a system, such as that of FIG. 1, the use of legacy vehicles within the system may limit the ITS functionality. In this regard, an ITS system may want a dynamic awareness of non-V2X enabled vehicles. For example, such ITS system may want to know the location of the vehicle on a roadway, a speed of such vehicle, including whether it is moving quickly or slowly, whether the vehicle is parked or causing an obstruction and whether or not the vehicle is capable of any automatic or autonomous actions, such as platooning or the automatic application of brakes, among other options.

However, generally a non-V2X enabled vehicle cannot be present as part of an ITS system. It cannot share information with the ITS system, nor can it be informed by the ITS system of hazards. This is detrimental to the overall operation of the ITS system, as information on non-V2X enabled vehicles cannot be dynamically considered.

Therefore, in accordance with the embodiments of the present disclosure, a mobile device may act as a proxy for a non-V2X vehicle to inform the ITS system of the vehicle's presence, location, and other information such as dimensions, type, capabilities, speed, direction, among other such information. Further, such mobile device may also provide a driver with information about local driving hazards, conditions, and an awareness of other vehicles via visual or audio alerts in some embodiments.

In order to accomplish the above, in some embodiments a mobile device may store a local dynamic map. Further, in some embodiments the mobile device may communicate with a vehicle head unit using an interface such as Apple CarPlay™, Android Auto™, or MirrorLink, among other options. Such local dynamic maps and interfaces are described below.

Local Dynamic Map (LDM)

An LDM is typically generated by a vehicle's ITS system such as that described in FIG. 1 above. One example of an LDM is provided in the ETSI Technical Report (TR) 102863, "Intelligent Transport Systems (ITS); vehicular communications; basic set of applications; local dynamic map (LDM); rationale for a guidance on standardization", as provided for example in version 1.1.1, June 2011.

Figure 2:
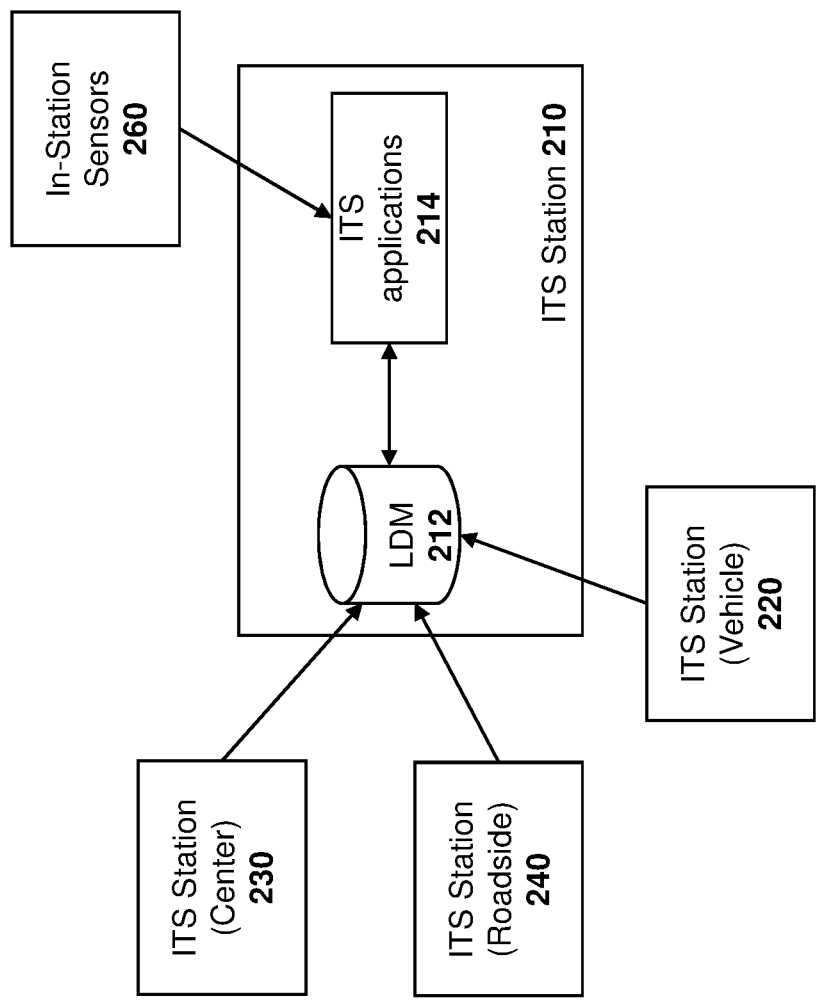
FIG. 2 is a block diagram showing a local dynamic map within an ITS station.

Reference is now made to FIG. 2. Information about the local environment is useful in cooperative ITS systems. ITS applications use information both on moving objects such as other vehicles nearby and on stationary objects such as traffic road signs. Common information used by different applications may be maintained in a local dynamic map.

Therefore, in the embodiment of FIG. 2, an ITS station 210 includes a local dynamic map 212 along with ITS application 214.

The local dynamic map 212 is a conceptual data store located within and ITS station 210 and contains information which is relevant to the safe and successful operation of ITS applications 214. Data can be received from a range of different sources such as an ITS station on a vehicle 220, an ITS central station 230, an ITS roadside station 240, along with sensors within ITS station 212, shown by block 260 in the embodiment of FIG. 2.

Read and write access to data held within LDM 212 is achieved using an interface. The LDM offers mechanisms to grant safe and secured access. Thus, the LDM 212 is able to provide information on the surrounding traffic and roadside unit (RSU) infrastructure to applications that need such information.

LDM 212 contains information on real-world and conceptual objects that have an influence on the traffic flow. In some embodiments, the LDM 212 is not required to maintain information on the ITS station it is part of, but may do so if necessary for particular implementations.

LDM 212 may store data describing real-world objects in various categories. For example, four different categories of data are:

Type 1: permanent static data, usually provided by a map data supplier;
Type 2: quasi-static data, obtained during operation, for example changed static speed limits;
Type 3: transient dynamic information such as weather situations and traffic information; and
Type 4: highly dynamic data such as that provided in a cooperative awareness message (CAM).

Typically, the LDM 212 will not contain type 1 data. Not all ITS stations require type 1 data and if such data is needed by an application within ITS station 210, such data may be optimized and stored for the respective specific application. However, as LDM data is potentially relevant for applications that make use of type 1 data, location referencing data relating to the type 2, type 3 and type 4 information to the type 1 map data may be provided. This location referencing may be complex and therefore may require adequate location referencing methods.

As indicated above, type 4 information may include CAM messages. Rather than CAM, in some jurisdictions, basic safety messages (BSM) for V2V safety applications have been defined. Such basic safety messages may come in two parts.

In the first part, a BSM contains core data elements including vehicle size, position, speed, heading, acceleration, brake system status, among other such information. Such data may be transmitted frequently, for example 10 times per second.

In the second part, BSM data may be added to the first part data depending on events. For example, if an automated braking system is activated then part two data may also be provided. Part two data may contain a variable set of data elements drawn from many optional data elements. It may be transmitted less frequently and may be transmitted independent of the heartbeat messages of part one.

In one embodiment, BSM messages may be transmitted over Dedicated Short Range Communications (DSRC), which for example may have a range of about 200 meters.

The BSM messages are an alternative standardized set of messages to the ETSI defined CAM and Decentralized Environmental Notification Message (DENM).

MirrorLink

In some embodiments described herein, various techniques for identifying whether a mobile device is within the vehicle and also identifying whether the vehicle has capabilities to support V2X functionality are done through an infotainment system on the vehicle. Various infotainment systems exist within the automobile industry. Interfaces or communications links to interact with such infotainment systems include Apple CarPlay™, Android Auto™, or MirrorLink, among other options. The embodiments described below do not depend on a particular interface between a mobile device and the infotainment system. As one example, MirrorLink is described below. However, the use of MirrorLink is not limiting.

MirrorLink is an open standard and provides a concept for integrating a mobile device, referred to as a MirrorLink Server, and a vehicle head unit, referred to as a MirrorLink Client.

Figure 3:
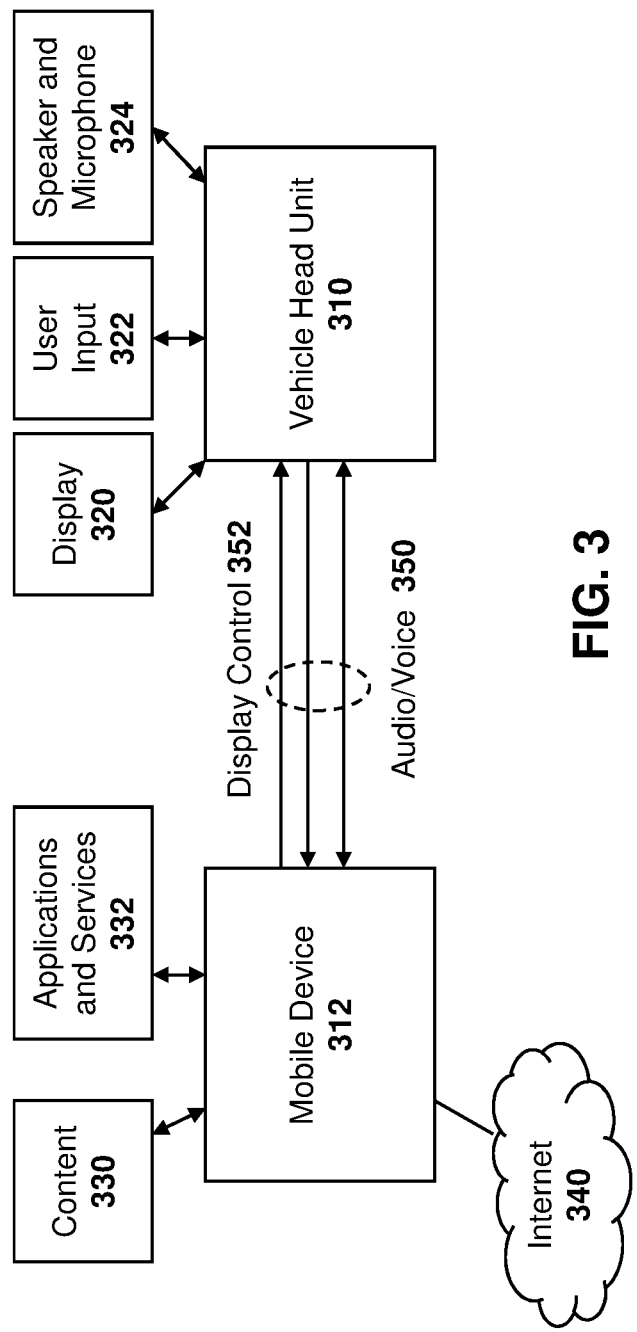
FIG. 3 is a block diagram showing a connection between an electronic device and a vehicle head unit.

Referring to FIG. 3, a vehicle head unit 310 is a unit which manages the various components of the infotainment system, as well as interaction with a mobile device 312. Vehicle head unit 310 may interact with various components of the vehicle, including for example a display 320, user input 322 and speakers and microphones 324.

Communications may occur between vehicle head unit 310 and an electronic device such as mobile device 312. The mobile device 312 may have access to content 330, as well as applications and services 332.

The mobile device 312 may further have a communications system that allows connection to wide area networks such as the Internet 340.

In a MirrorLink context, the control and interaction of applications and services running on the mobile device will be replicated into the vehicle environment. Diverting display and audio outputs to the vehicle head unit comes together with receiving key and voice control input from the head unit. Thus, audio and voice control may travel between the mobile device 312 and the vehicle head unit 310, as shown by arrow 350. Further, display control may also be provided, as shown by arrow 352.

Figure 4:
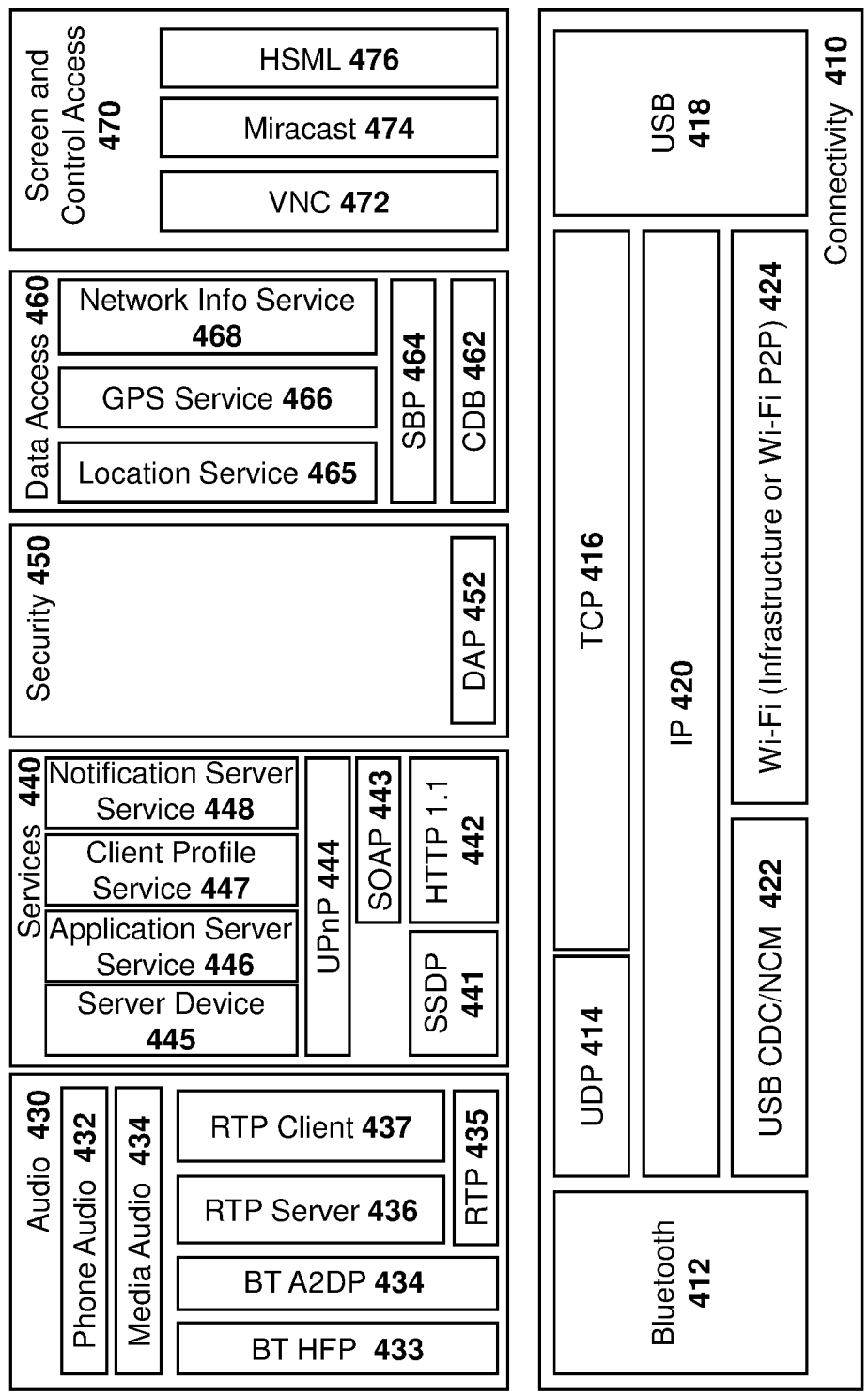
FIG. 4 is a block diagram showing an example Mirror-Link architecture.

A high level protocol architecture for MirrorLink is provided in FIG. 4. In particular, a connectivity layer 410 can provide various connectivity options, including Bluetooth 412, Universal Datagram Protocol (UDP) 414, Transport Control Protocol (TCP) 416, Universal Serial Bus (USB) 418, Internet Protocol (IP) 420, USB Communication Device Class/Network Control Model (CDC/NCM) 422 or Wi-Fi 424, among other options.

An Audio Layer 430 may include phone audio 432 and media audio 434. Further, audio layer 430 may include Bluetooth Hands-Free Profile (BT HFP) 433, Bluetooth Advanced Audio Distribution Profile (BT A2DP) 434, Realtime Transport Protocol (RTP) 435, RTP server 436 or RTP client 437.

A services layer 440 allows for service delivery and service discovery. Services layer 440 may allow access using the Simple Service Discovery Protocol (SSDP) 441, Hypertext Transfer Protocol (HTTP) 1.1 442, Simple Object Access Protocol (SOAP) 443, Universal Plug and Play (UPnP) 444, a server device 445, application server service 446, client profile server 447 or notification server service 448.

A security layer 450 may include a Device Attestation Protocol (DAP) 452.

Data access layer 460 may include Command Data Bus (CDB) 462, Service Binary Protocol (SBP) 464, location service 465, GPS service 466 and network info service 468.

A screen and control access layer 470 may include virtual network controller (VNC) 472, Miracast 474 and High Speed Media Link (HSML) 476.

Figure 5:
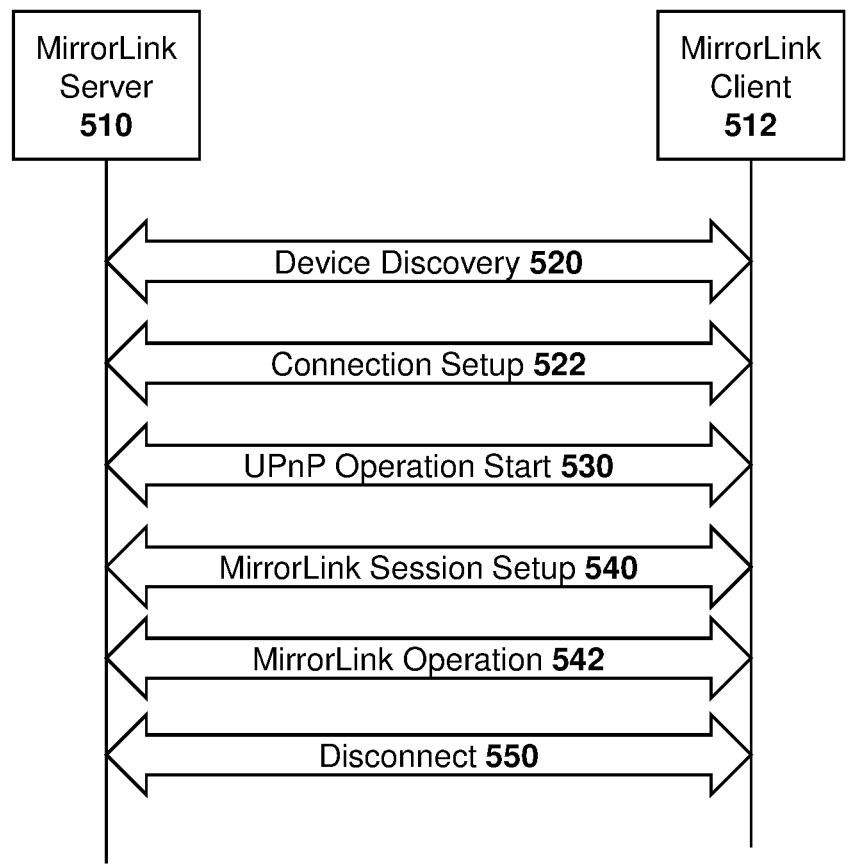
FIG. 5 is a dataflow diagram showing a high level session sequence.

Reference is now made to FIG. 5, which shows a high-level MirrorLink session sequence diagram. During a device discovery phase, devices detect each other as MirrorLink enabled devices. For example, a MirrorLink server 510 may communicate with a MirrorLink client 512.

In the connection setup phase, a physical connection is established, including negotiation of the group ownership in Wi-Fi Peer-to-Peer (P2P) networks, setting up the USB CDC/NCM connection and the IP address set up. For example, in FIG. 5, MirrorLink server 510 and MirrorLink client 512 perform device discovery 520.

Subsequently, connection setup may occur, as shown by arrow 522, which allows IP addresses to be assigned.

After IP addresses have been assigned the UPnP operation starts, as shown by arrow 530, leading to the establishment of the MirrorLink session.

A MirrorLink session set up 540 may then occur.

After successful MirrorLink session setup, the MirrorLink operation 542 starts, where the user is operating a MirrorLink client device in order to access and control applications on the MirrorLink server device.

The MirrorLink session ends when the user disconnects the physical connection, moves out of the vicinity of the MirrorLink client device, or terminates the MirrorLink functionality on either device. Disconnection is shown by arrow 550 in the embodiment FIG. 5.

Figure 6:
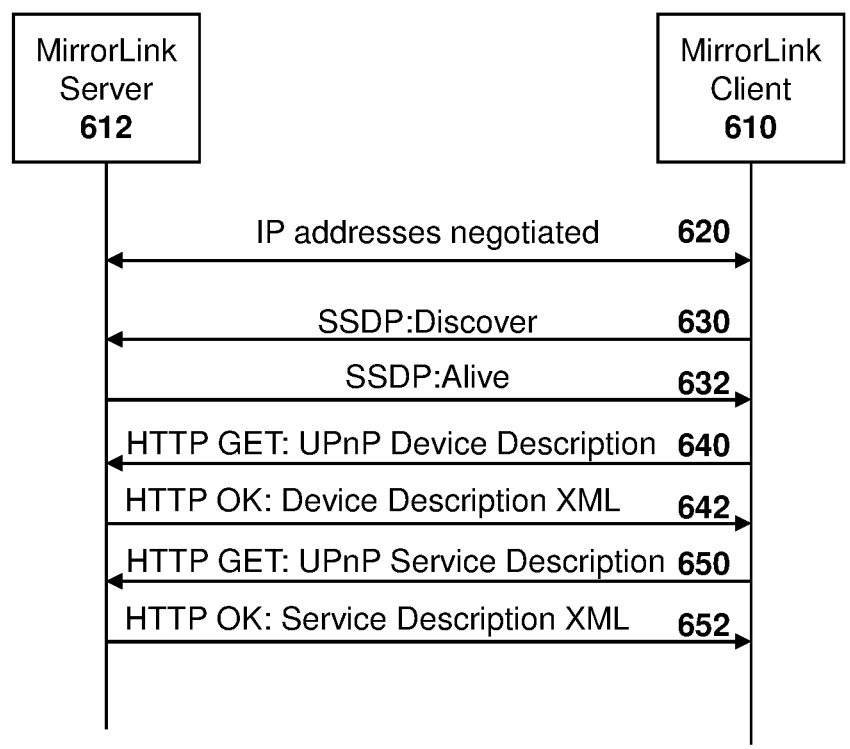
FIG. 6 is a dataflow diagram showing a universal plug and play operation start sequence.

Reference is now made to FIG. 6, which shows a UPnP operation start sequence diagram. A MirrorLink client 610, which may be the vehicle, may obtain information about a MirrorLink server 612, which may be a mobile device, as well as a description of the services supported.

In particular, as shown in FIG. 6, an IP address between the server 612 and client 610 may be negotiated, as shown by arrow 620.

Subsequently, a Simple Service Discovery Protocol (SSDP): Discover message 630 may be sent from client 610 to server 612. In response, an SSDP: Alive message 632 may be returned to client 610.

Next, an HTTP GET: UPnP Device Description message 640 may be sent to server 612 and an HTTP OK: Device Description Extensible Markup Language (XML) response 642 may be provided back to client 610.

The description of services may then be obtained in an HTTP GET: UPnP Service Description message 650 and server 612 may then reply with an HTTP OK: Service Description XML message 652 back to client 610.

Figure 7:
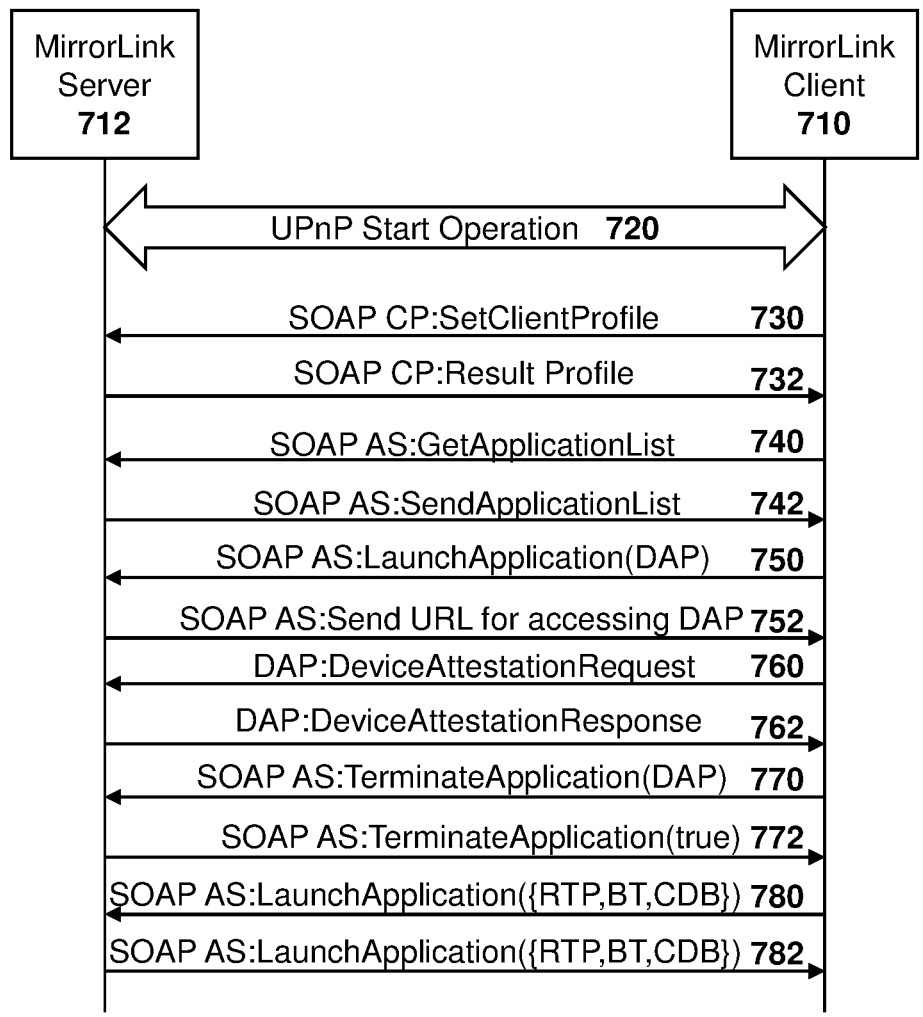
FIG. 7 is a dataflow diagram showing a MirrorLink session setup sequence.

Reference is now made to FIG. 7, which shows a MirrorLink session setup sequence diagram. In particular, MirrorLink client 710 communicates with MirrorLink server 712.

A UPnP start operation, shown by arrow 720, may initiate the process of FIG. 7.

Subsequently, a SOAP CP: SetClientProfile message 730 may be provided to server 712. In response, a SOAP CP: Result Profile message 732 is provided back to client 710.

The client 710 may then provide a SOAP AS: GetApplicationList message 740 to server 712 and in response a SOAP AS: SendApplicationList message 742 is provided back to client 710.

Client 710 may then launch an application as shown by SOAP AS: LaunchApplication(DAP) message 750 and a URL for accessing the application is provided back to the client in SPAD:AS Send URL For Accessing DAP message 752.

The client 710 may then provide a DAP:DeviceAttestationRequest message 760 to server 712 and, in response, receive a DAP:DeviceAttestationResponse message 762.

Once the application is finished, a SOAP AS:TerminateApplication(DAP) message 770 may be sent to server 712 and a SOAP AS:TerminateApplication(true) response 772 may be sent back to client 710.

Subsequent, applications may be launched or terminated. For example, in FIG. 7 a launch application message 780 may be sent between client 710 and server 712. In response, the application may be launched as shown by message 782, sent back to client 710.

In the embodiments of FIGS. 4, 5, 6 and 7, the vehicle head unit may indicate its capabilities to the mobile device using the SOAP:CP:SetClientProfile message. The client profile details capability information concerning the device to head unit communication features, including security aspects, as well as audio and visual display and user interface capabilities and features.

Proxy V2X Device

Based on the above, in accordance with one embodiment of the present disclosure, a mobile device provides a low cost and readily available option to allow non-V2X enabled vehicles to connect to an ITS system, thereby enhancing the ITS system's overall operation, as well as a user's safety and convenience. A mobile device, as used herein, can be any device that may be brought into the vehicle, and can include a portable device, smartphone, mobile station, user equipment, laptop, smart watch, smart glasses, among other options.

A mobile device may in some cases only communicate with an ITS system, conveying information based on that obtained from its own in-built sensors, thereby providing limited V2X sensor capabilities. However, in other cases, a short range wired or wireless connection such as USB, Wi-Fi, Bluetooth, Bluetooth low energy, near field communications, among others, may allow connectivity from the mobile device to aftermarket sensors so that the mobile device can provide additional information to the ITS system.

Figure 8:
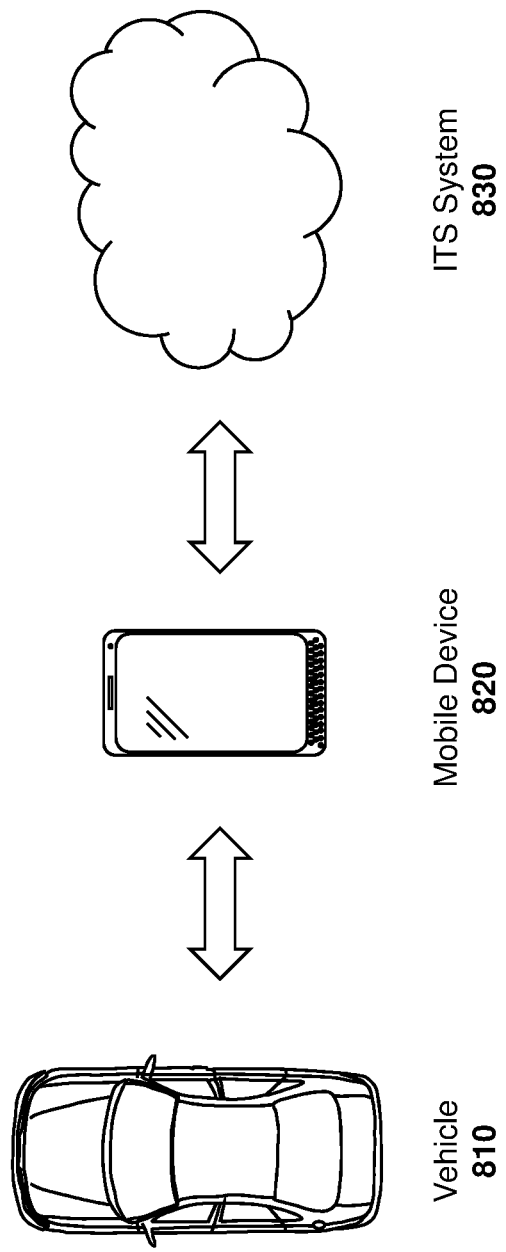
FIG. 8 is a block diagram showing a device architecture for a proxy intelligent transportation system station.

Reference is now made to FIG. 8, which shows a basic architecture for use in the present disclosure.

In particular, a non-V2X vehicle 810 may become associated with a mobile device 820, as provided below. The association may involve the detection by the device 820 that it is within a vehicle 810, for example using sensors or short range communications between the device and the vehicle, as provided below.

Thereafter, mobile device 820 may interact with an ITS system 830 to act on behalf of vehicle 810 to send and receive ITS data.

A mobile device 820 may, for example, be carried by a user and move into and out of the vehicle. In other cases, mobile device 820 may be a device that is installed within vehicle 810 as an after-market device temporarily or permanently.

Mobile device 820 may have display and audio output capabilities to provide notifications or messages to a system user. Further, the mobile device 820 may have sensors such as a Global Navigation Satellite System (GNSS) sensor, accelerometers, micro-electromechanical systems (MEMs) sensors, among other options.

The ITS system 830 may make use of V2V and V2I connectivity provided using single or multi-hops across multiple ITS stations in an ad hoc style network.

Communications between mobile device 820 and the vehicle 810 are optional in some embodiments. However, if such communications exist, the communications may contain data such as identity, vehicle information or sensor data. Communications between mobile device 820 and ITS stations within the ITS system 830 may be unidirectional or bidirectional and may make use of broadcast CAM, DENM or BSM messages.

As described below, the communications may take on a different form depending if the mobile device is in a moving vehicle on whose behalf it is sending messages, or acting as a portable device carried by a pedestrian.

Figure 9:
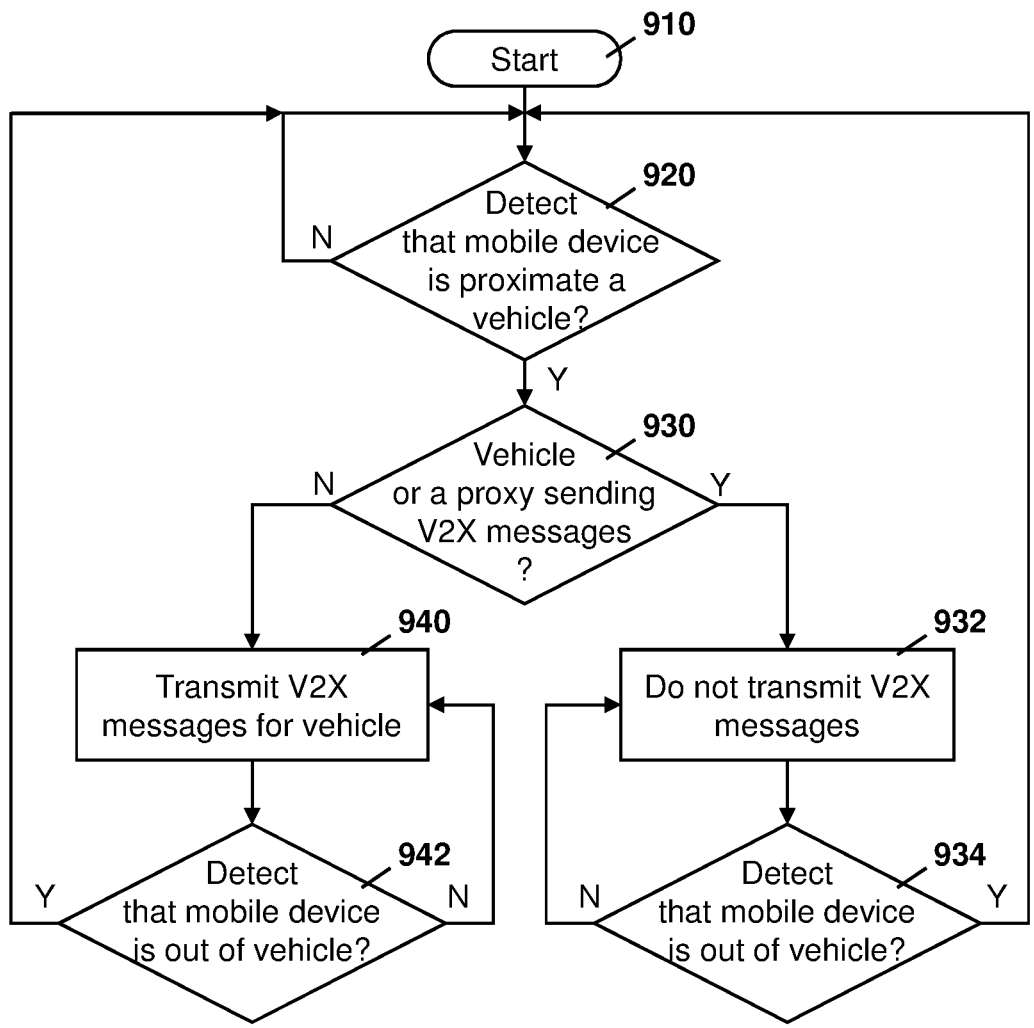
FIG. 9 is a process diagram showing a process for a mobile device to become a vehicle proxy intelligent transportation system station.

Reference is now made to FIG. 9, which shows a process in accordance with embodiments of the present disclosure. The process of FIG. 9 starts at block 910 in which a mobile device is not operating in a V2X mode.

The process then proceeds to block 920 in which a check is made to determine whether or not the mobile device is proximate to a vehicle. For example, a mobile device proximate to the vehicle may be within the vehicle cabin, trunk or boot, engine compartment, or attached to the outside of the vehicle, for example on the vehicle roof, at the side of the vehicle, under the vehicle, among other options.

There are various ways that a mobile device may detect that it is proximate to a vehicle. In a first case, GNSS coordinates and/or gyroscopic measurements obtained over time on the mobile device are used to perform computations which indicate that speed, position and/or acceleration are consistent with the mobile device being in motion within a vehicle.

In a second case, a short range communication system, such as a near field communication (NFC) tag, radiofrequency identification (RFID) tag or a local area network such as Bluetooth Beacon within a vehicle, may provide a mobile device with information to indicate that the mobile device is within the vehicle. For example, in one embodiment, the beacon for the NFC, RFID or Bluetooth may be in the dashboard or door of the vehicle In a further embodiment, the detection that the device is proximate to the vehicle may be accomplished utilizing Bluetooth pairing with the vehicle's infotainment system. In particular, the pairing may exist between the mobile device and the infotainment system. For example, in one embodiment, a mobile device may store in its memory an identifier of the vehicle radio system, such as Bluetooth that it paired with in the past. Such identifier may, for example, be the Media Access Control (MAC) address of the infotainment radio. When the device detects the identity or MAC address, this indicates proximity to the vehicle and may enable the mobile device to enter a proxying mode more quickly and efficiently as described below. In other cases, proximity may be assessed by measuring signal strength or Bit Error Rate (BER) of signals characteristic of vehicles and discarding signals that do not meet a threshold.

In a further embodiment, the detection at block 920 may be based on a manual configuration or pre-configuration utilizing a user interface of the mobile device. For example, a vehicle occupant may utilize the user interface on the mobile device to switch the mobile device into a mode in which the device acts as a proxy for the vehicle. The occupant may also input data that is used to generate V2X messages via the user interface. Such data may include, for example, vehicle dimensions, or the make, model or Vehicle Identification Number (VIN). Other information is also possible. Such information can be used by the mobile device to perform a lookup of the vehicle dimensions.

In other embodiments, the mobile device may use information such as Bluetooth MAC or Wi-Fi MAC address to also access information about the vehicle that it is associated with.

In some embodiments, the mobile device may determine whether it is authorized to act as a V2X proxy for a vehicle. For example, in some cases the mobile device may only operate as a proxy if it belongs to the driver of the vehicle or the vehicle is a rental car and the corresponding authentication and authorization mechanisms have been put in place. However, the detection of whether the authorization exists is optional.

From block 920, if it is detected that the mobile device is not proximate to a vehicle then the process proceeds back to block 920 and continues to loop until the device detects that it is proximate to a vehicle.

Once the device detects that it is proximate to a vehicle, the process proceeds to block 930 in which a check is made to determine whether the vehicle is sending V2X messages, or if other devices are sending V2X messages on behalf of the vehicle.

For example, the check at block 930 may detect that the vehicle has no V2X capability by using several methods. In one embodiment, the mobile device may use a local dynamic map (LDM) to determine whether any representation of the vehicle exists.

Specifically, the mobile device may store and update an LDM, such as that described with regards to FIG. 2 above. The mobile device may use a LDM to determine whether the vehicle is represented. In particular, the mobile device may use positioning information such as GPS or GNSS and may receive the V2X messages from infrastructure or other vehicles to build the LDM. This enables the mobile device to determine that there are no representations of the vehicle within which the mobile device is located in the mobile device's current and/or previous locations. Based on such information, the check at block 930 may determine that the vehicle does not have V2X capabilities or that other proxy devices are not acting on behalf of the vehicle.

In another embodiment, the mobile device may monitor V2X signals and determine that a V2X Radio Frequency (RF) signal from a vehicle is either low or nonexistent, indicating that neither the vehicle nor any other devices in the vehicle are generating V2X signals.

In another embodiment, the check at block 930 may obtain information from a vehicle's infotainment system via local area radio connectivity to determine whether the vehicle supports integrated V2X. Such local area radio connectivity may, for example, include Bluetooth, Bluetooth low energy, Wi-Fi, among other options.

Specifically, a vehicle's network is typically partitioned into multiple domains. The domain that is accessible by the Bluetooth or Wi-Fi is typically the infotainment domain, which usually does not have access directly to the safety systems such as the Advanced Driver Assistance System (ADAS) system. Thus, options for determining whether the vehicle has V2X capabilities may include configuring the infotainment system to provide information on whether the ADAS (V2X) capability is supported, as described in more detail below.

Alternatively, the mobile device may request information from a remote database using an identifier such as the infotainment system serial number or Bluetooth or WiFi MAC address to determine whether the V2X capability is supported. Such request may be made possibly in conjunction with other information such as the year, make and model of the vehicle, among other such supplementary information. Based on the response received, the mobile device may determine whether or not the vehicle has integrated V2X capabilities.

In a further embodiment, the check at block 930 may utilize an NFC or RF tag, or a barcode or Quick Response (QR) code that is scanned or read by the mobile device to determine V2X capabilities of the vehicle. Specifically, an NFC or RF tag, or the barcode or QR code may indicate whether or not the vehicle is V2X enabled. In one embodiment, the tag or code may further encode a uniform resource locator (URL) of the server from which the mobile device can access such information. Further, supplementary information that the mobile device can use to generate V2X messages such as the vehicle type, dimensions, among other such information may also be available utilizing such NFC/RF tag or bar or QR code.

Further, information provided by reading the NFC or RFID tags may invoke the V2X functionality on the mobile device. The mobile device would be tied or paired to the NFC/RFID tag to avoid other onboard portable devices from enabling their V2X functionality in this embodiment.

In one case, the use of the tags may also allow for the deactivation of the V2X functionality. In particular, the low-power active tags with limited range utilizing keep alive signaling may be used to deactivate the mobile device V2X functionality when such keep alive signaling is no longer detected by the mobile device. This typically would happen when the mobile device leaves the confines of the vehicle.

In a further embodiment, instead of an NFC or RFID tag, a different low-power radio connection may be established between the vehicle and the mobile device from which the mobile device can gather information. For example, such low-power radio connection may be Bluetooth, Bluetooth Low Energy or other similar signal. In this embodiment, the vehicle mounted device may also manage the determination of which mobile devices will act as a proxy for the vehicle. This is achieved by requiring the mobile device to query the vehicle mounted device to determine whether it may act as a proxy for the vehicle.

In still a further embodiment, the check at block 930 may only be enabled when it is determined that the mobile device is receiving charge from an external source. For example, this may occur when a mobile device's USB or other charging port is connected to a vehicle. Mobile devices such as smartphones already have the capability to determine whether they are receiving an external charge and there is typically integration into user interface which provides a visual indication to the user that the phone is charging. In this case, a proxy V2X application would make use of this existing battery charging application program interface (API) in order to determine whether or not it should enable the proxy V2X functionality. Further, in this case, USB functionality may be extended so that vehicle data and permissions may be exchanged over the USB connection in addition to merely providing charge.

Based on the check at block 930, if it is detected that the vehicle is sending V2X messages or that another device is sending V2X messages on behalf of the vehicle, then the process proceeds to block 932 in which the mobile device does not transmit V2X messages.

From block 932, the process may then proceed to block 934 in which a check is made to determine whether the device has left the vehicle. For example, if the vehicle is paired with a limited coverage radio connection then the check at block 934 may determine that a keep alive signal is no longer being detected. Similarly, the check at block 934 may involve the mobile device ceasing tethering or pairing from an NFC/RFID tags or other radios.

In other cases, manual or automatic reconfiguration of the device to no longer be associated with the vehicle may occur. For example, this may occur utilizing the user interface of the mobile device, by scanning barcodes or QR tags on exiting the vehicle, detection through GPS, GNSS accelerometers or gyroscopic measurements that the device is no longer moving for a threshold period time, among other options.

If the check at block 934 determines that the device is still in a vehicle then the process may proceed back to block 932. Otherwise, once the device has exited the vehicle, the process may resume by proceeding from block 934 back to block 920.

In some embodiments, even if the check at block 934 determines the device is still in the vehicle, the process may periodically proceed back to block 930 to check the status with regards to transmission of V2X messages corresponding to the vehicle.

Conversely, from block 930, if it is determined that neither the vehicle nor a proxy is sending V2X messages for that vehicle then the device should act as a V2X proxy, the process proceeds to block 940 in which the device may transmit and receive V2X messages on behalf of the vehicle. Such transmission is described in more detail below.

From block 940, the process may then proceed to block 942 in which a check is made to determine whether or not the device is still proximate to the vehicle. Such check may be similar to the check made at block 934 as described above.

If the device is proximate to the vehicle, the process may proceed back to block 940 to continue to transmit messages.

Conversely, if the check at block 942 determines that the device is no longer proximate to the vehicle then the process may proceed back to block 920 to check whether the device has entered a vehicle again.

In some embodiments, even if the check at block 942 determines the device is proximate to the vehicle, the process may periodically proceed back to block 930 to check the status with regards to transmission of V2X messages corresponding to the vehicle. If the status has changed and another entity is now generating V2X messages on behalf of the vehicle, then the mobile device may cease acting as a proxy for the vehicle.

Selection of Mobile Device

As indicated above with regard to block 930, the vehicle can provide universal plug-and-play client profile information that enables a mobile device to determine whether or not it should provide proxy V2X service. In one example, utilizing the MirrorLink architecture described above, a modification to the "client profile" XML would enable a mobile device to learn the capabilities of a vehicle. An example XML response is provided in Table 2. The example XML of Table 2 may be provided using the services layer 440 from FIG. 4 above.

TABLE 2

ClientProfile' XML coding, with modification to
indicate support or not of vehicle integrated V2X service A_ARG_TYPE_ClientProfile
  The value of A_ARG_TYPE_ClientProfile is an XML block corresponding to a list
    of preferences, settings and capabilities of the MirrorLink Client.
The following example illustrates the usage of this variable:
<?xml version="1.0" encoding="UTF-8"?>
<clientProfile>
    <clientID>Cl_1</clientID>
    <friendlyName>Client One</friendlyName>
    <manufacturer>man_2</manufacturer>
    <modelName>CL_Model2</modelName>
    <modelNumber>2009</modelNumber>
    <iconPreference>
        <mimetype>image/png</mimetype>
        <width>240</width>
        <height>240</height>
        <depth>24</depth>
    </iconPreference>
    <connectivity>
        <bluetooth>
            <bdAddr>1A2B3C4D5E6F</bdAddr>
            <startConnection>false</startConnection>
        </bluetooth>
    </connectivity>
    <rtpStreaming>
        <payloadType>0,99</payloadType>
        <audioIPL>4800</audioIPL>
        <audioMPL>9600</audioMPL>
        <lssMax>1750</lssMax>
        <lssAvg>850</lssAvg>
    </rtpStreaming>
    <services>
        <notification>
            <notiUiSupport>true</notiUiSupport>
            <maxActions>3</maxActions>
            <actionNameMaxLength>15</actionNameMaxLength>
            <notiTitleMaxLength>25</notiTitleMaxLength>
            <notiBodyMaxLength>100</notiBodyMaxLength>
        </notification>
    </services>
    <mirrorLinkVersion>
        <majorVersion>1</majorVersion>
        <minorVersion>3</minorVersion>
    </mirrorLinkVersion>
    <presentations>
        <presentation>vncu</presentation>
    </presentations>
    <misc>
        <driverDistractionSupport>true</driverDistractionSupport>
        <integratedItsSupported>true</integratedItsSupported>
        <mlUiMoe>
            <mode>classic</mode>
            <mode>immersive</mode>
        </mlUiMode>
        <mlUiControl>
            <control>pointer</control>
            <control>vc_rtp</control>

TABLE 2-continued

ClientProfile' XML coding, with modification to
indicate support or not of vehicle integrated V2X service <control>ptt</control>
        </mlUiControl>
        <serverInfo>
            <info>none</info>
        </serverInfo>
    </misc>
    <certificates>
        <clientDevice>[certificate Data]</clientDevice>
        <clientCA>[certificate Data]</clientCA>
    </certificates>
</clientProfile>

As seen in bold in Table 2 above, a field entitled "integrated ITS supported" may be added to indicate whether or not the intelligent transportation system is supported by the vehicle. If yes, the mobile device may make the determination that it does not need to provide proxy services.

In other embodiments, a field may further be added to indicate whether or not a device is already paired to the vehicle for providing ITS services. This would again enable a second device to determine whether to provide the V2X services for the vehicle.

Thus, based on Table 2 above, if a mobile device determines that a vehicle already supports integrated ITS and thus the "integrated ITS supported" field is set to true, then the mobile device does not need to activate its own V2X proxy service, nor does it need to advertise the availability of the service.

Conversely, if the head unit indicates the vehicle does not support integrated V2X services, for example by providing a false in the "integrated ITS supported" field above, then the mobile device may indicate, in a SendApplicationList message that proxy V2X service is an application it can offer or which has already been launched.

A vehicle head unit can also optionally cause the mobile device to launch a "proxy V2X" application using the SOAP AS.: LaunchApplication(DAP) command as provided above.

The head unit can also store in memory a record of whether it has already launched a "proxy V2X" application on some other device and in this case the head unit may not cause the proxy V2X application to be launched on a new mobile device with which it is currently communicating. The proxy V2X application may also include some "keep alive" signaling between the mobile device and the head unit so that the head unit knows when the device on which it has previously requested the launching of the proxy V2X service is no longer able to provide the service. For example, this may occur when such mobile device has left the vehicle.

As an alternative to keep alive signaling, the head unit may be informed of the loss of connectivity of the mobile device on which it has previously launched a proxy V2X application through a lower layer indication such as a radio or USB disassociation between the device and the head unit.

In some embodiments, a mobile device may optionally indicate that it does not support the V2X application or not launch such proxy V2X application even though it has been requested. This may be done if the mobile device determines through other mechanisms such as through monitoring of the LDM, that some other device is already acting as a V2X proxy for the vehicle. This functionality may provide useful to cover the case that potentially not all V2X proxy capable mobile devices will be capable of supporting the mobile device interface specifications such as MirrorLink.

For example, in the case of a mobile device communicating with a "old" MirrorLink head unit that does not support the new XML field described above with regard to Table 2 and/or that does not support any other V2X proxy related functionality, the mobile device may have to use one of the alternative methods described above with regard to block 930 in order to determine whether there is a need to act as a V2X proxy.

The mobile device, specifically the proxy V2X application, can leverage the user interface UI of the vehicle system to provide visual or audio information to the driver or in order to receive speech commands from a driver as described below.

Data Access Methods

In an alternative embodiment, rather than services layer 440 of FIG. 4, data access layer 460 could be used to provide a mobile device with information with regard to the ITS capabilities of a vehicle. Such information could then be used to make the determination at block 930 of FIG. 9.

Specifically, a mobile device could use information such as that which is provided using Mirrorlink SBP/CDB/TCP/IP protocols to determine whether the vehicle supports ITS. In this regard, a new "vehicle capabilities and status service" could be defined to enable a mobile device to query the infotainment system for information about the vehicle features, capabilities and current status, which helps to enable the mobile device to determine whether it should act as a proxy.

An example encoding is provided in Table 3 below.

TABLE 3

Vehicle Capabilities and Status Service
Vehicle capabilities and status service

/* The purpose of vehicle capabilities and status service is to provide the Mirrorlink server with information about the capabilities and status of the vehicle
*/
SERVICE com.mirrorlink.vehiclecapabilitiesandstatus {
    /* STRUCTURE holding vehicle capability information */
    STRUCTURE VehicleCapabilityAndStatus {
        BOOLEAN integratedITSsupport;
        /* A zero value indicates there is no vehicle integrated ITS support. A
        one indicates that there is vehicle integrated ITS support*/
        BOOLEAN CurrentProxyStatus
        /* A zero value indicates that another device is already acting as a V2X
        proxy for this vehicle. A one indicates that the head unit is unaware of
        any other devices acting as a V2X proxy for this vehicle */
    };
    OBJECT VehicleCapabilitiesAndStatus {
        STRUCTURE <Vehiclecapabilityandstatus> vehiclecapandstat;
    };
};

As seen in Table 3 above, a vehicle capabilities and status structure may provide Boolean fields with regard to whether the vehicle includes integrated ITS support and whether there is a current proxy device already being used.

The vehicle's capability and status service may use objects as provided in Table 4 below and their access capabilities.

TABLE 4

Vehicle Capabilities and Status Service Objects

| Object Name | Access Type | Subscription Type |
|---|---|---|
| VehicleCapabilitiesAndStatus | READABLE | NONE |

A SBP sink endpoint may access the VehicleCapabilitiesAndStatus object using the SBP Subscribe and Get commands.

In a similar way to that described with regard to the universal plug-and-play example above, the 'Data Access' method can be used by a mobile device to access information ('CurrentProxyStatus') on a head unit which indicates whether the head unit is aware of another device that is already acting as a V2X proxy. In order to set the CurrentProxyStatus, a head unit could subscribe to the mobile devices with which it is paired and obtain from them a new ProxyActivation object and to determine from them any changes to such an object. Such an object may include structures which could indicate whether V2X proxy functionality is active on the mobile device or whether V2X proxy functionality is inactive on the mobile device, for example.

V2X Messages

In FIG. 9 above, once a determination has been made that a mobile device needs to act as a proxy for a vehicle and the process proceeds to block 940, the mobile device may send V2X messages. In this case, the mobile device may disable pedestrian related V2X functionality, if active, and enable vehicle related ITS functionality.

In one embodiment, the proxy V2X operation may be defined as a new ITS application type. In particular, the ITS-application identifier (ITS-AID) may indicate the overall type of permissions being granted. For example, one ITS-AID indicates that the sender is entitled to send CAMs.

Table 5 below shows an example ETSI ITS definition, with the proxy service added.

TABLE 5

ETSI ITS standardized ITS-AIDs, with new Proxy service added

| Date of application | ITS-AID value | Length in octets | ITS application name | Type | Notes |
|---|---|---|---|---|---|
| January 2015 | 36 | 1 | CA Basic service | ITS application | CA basic service is specified in ETSI EN 302 637-2 |
| January 2015 | 37 | 1 | DEN Basic service | ITS application | DEN basic service is specified in ETSI EN 302 637-3 |
| | TBD | 1 | Proxy service | ITS application | |

There are at least two options for V2X message generation when a mobile device is acting as a proxy.

In a first option for message generation, existing messages for CAM, DENM, and BSM may be extended to accommodate such proxy messages.

In a second option, a new proxy service message may be defined. Such new message may optionally be associated with a new ITS AID.

Examples of messages are provided below.

A mobile device acting as a proxy ITS station can have different capabilities. For example, a standalone mobile device may have no essential vehicular connectivity. This appliance has only its native sensor set comprising six sensor axes (accelerometer and gyroscope) and a position determining element such as a GPS, GNSS or equivalent functioning receiver.

Alternatively, the audio and/or video data output from the mobile device may be connected to the audio or multi-media system in a vehicle. This may itself be possible as a result of the installation of an aftermarket system in the vehicle such as an infotainment system.

In a further option, the mobile device may be connected to aftermarket sensors such as cameras or other types of presence detectors.

In a further option, the mobile device may be connected to a vehicle data-bus, such as CANbus or Automotive Ethernet, which allows access to integrated sensors.

The type of V2X information provided by the device may be a result of the type of connectivity the mobile device has to after market sensors or vehicular systems.

In cases when a mobile device operates in proxy V2X mode with a reduced set of capabilities compared to a regular vehicular ITS station, any ITS transmission may need to be modified. For example, in a CAM message, some 'basic vehicle' fields may be set to null or missing. The proxy V2X station may, for example, have no information regarding exterior lights, acceleration control, occupancy and door open, among other similar parameters. For any such parameters, which are not optional, a value ('NULL') may be defined in order for the recipient ITS station to know these values are to be ignored. The mobile device acting as V2X proxy may use 'NULL' values in instances where sending the information element is not optional.

Providing Information to the Driver of a Non-V2X Enabled Vehicle

When a mobile device is acting as a proxy, in one embodiment the driver of a non-V2X enabled vehicle may benefit from ITS system information from the mobile device. In this case, ITS system information and alerts can be displayed to the mobile device display or provided using audio using the mobile device's speakers in one embodiment. Alternatively, a connection, such as Bluetooth, Wi-Fi, or USB, to any vehicle system may utilize the vehicle display or speakers to convey such information.

When using the vehicle infotainment system, visual display information may include information on infotainment screen for the driver. In this case, visual ITS related information may use MirrorLink or some other coupling system to relay information from the mobile device to the screen for display to the driver.

Such display may include LDMs or maps of traffic congestion indications, warnings or hazards with regard to road conditions, the presence of ITS vehicles, among other similar information.

In addition, or alternatively, audio alerts may be provided to the driver. This may be done either through a mobile device or conveyed through a connection such as MirrorLink to the vehicle's speaker system. Such audio alerts may include crash warnings, for example using MirrorLink and using RTP/UDP/IP. Crash warnings could for example be a constant tonal alarm or could be pre-coded speech saying something like "Crash Warning", among other options.

Audio alerts may further include lane departure warnings. The warning could again use a connection such as MirrorLink and RTP/UDP/IP. Lane departure warnings could, in one embodiment, be a set of beeps or be pre-code speech sayings something like "Lane Departure Warning". Other options are possible.

Audio or visual alerts may also be provided to a driver when a mobile device battery level becomes low. For example, if the battery level decreases below the threshold then the driver may be warned that the mobile device will cease providing proxy V2X functionality Further, when a mobile device loses connectivity to the ITS system it may optionally indicate this to a driver or user using e.g. an audio, haptic or visual indication and may reattempt connection to the ITS system unless the functionality has been manually deactivated by the user. For example, haptic indications may include vibration to the steering wheel, among other options.

The above embodiments are merely a few examples of indicative alerts, and other options are possible.

Providing Information from the Driver of a Non-V2X Enabled Vehicle

The above embodiments describe providing audio and visual alerts to a driver. In some cases, a proxy V2X station may provide information that originates from a driver. In this case, driver notification to the ITS system of incidents may be made. For example, driver notification may include indications of hazards, accidents, local road conditions, among other factors.

Further, a driver may be enabled to toggle the ITS system on or off via speech or utilizing speech recognition software or through physical input.

In the case of speech recognition, a driver could say pre-agreed words or phrases, such as "Activate Hazard Warnings", which would result in a generic hazard warning. A V2X message may be sent from a vehicle based on such warning.

Examples of architectures to support the above include a mobile device receiving the audio directly through its microphone and utilizing its own speech recognition software.

In an alternate embodiment, the mobile device is paired with the vehicle's infotainment system and can receive audio that has been recorded using the vehicle's microphones. In this case, the vehicle's microphone may be placed closer to the driver than a mobile device's microphone and may therefore be preferable. The raw audio stream may be provided to the mobile device using a connection such as MirrorLink and RTP/UDP/IP, for example. Such provision of audio may utilize existing mechanisms that would typically be used for phone call applications or other similar applications. Speech recognition software on the mobile device could then recognize the voice command and convey a trigger of a hazard warning via a V2X message.

In a further embodiment, speech recognition software in the infotainment system may be used to convert the speech to text, where the text is then provided from the head unit to the mobile device to allow the mobile device to interpret the text and convey the hazard warning.

In the case where speech recognition software is in the head unit, the textual information could be conveyed to the device. This may be done adding a new data access "speech to text" service in the infotainment system. For example, such speech to text service may utilize the encoding of Table 6 which could be used within a Mirrolink framework.

TABLE 6

Speech to Text Service

/** The purpose of speech to text service is to provide the Mirrorlink server with
textual information that the Mirrorlink client has gathered through a speech to text
conversion process
SERVICE com.mirrorlink.speechtotext {
    /* STRUCTURE holding text that has been derived from speech */
    STRUCTURE textfromspeech {
        STRING text;

TABLE 6-continued

Speech to Text Service

```
        /* A sequence of text*/
        };
    OBJECT TextFromSpeech {
        STRUCTURE <textfromspeech> providedtext;
    };
};
```

As seen in Table 6, a new structure is provided with a string of text

A vehicle capabilities service may use the objects of Table 7 below and their access capabilities.

TABLE 7

TextFromSpeech Object

| Object Name | Access Type | Subscription Type |
|---|---|---|
| TextFromSpeech | READABLE | ON CHANGE, REGULAR or AUTO |

An SBP Sink endpoint may be able to access the TextFromSpeech object using the SBP Subscribe and Get commands. The SBP source endpoint supports the use of regular interval and on change SBP subscription types. In the case of on-change, it is up to the data source to decide when to trigger a new notification.

An example formatting of an DEMN message that is generated in response to generic or verbally announced hazard warning is provided below.

Proxy Indications in V2X messages

In one embodiment, a mobile device has an ITS capability which typically might be more limited than a state of the art integrated on-board vehicle Original Equipment Manufacturer (OEM) ITS system, or a similar purpose built after market system. As the mobile device is reliant on, for the most part, the mobile device sensors, messages to other ITS stations may need to communicate different: reliability/availability; accuracy; capability; and/or confidence levels. This will indicate to the other ITS stations that the information may not be to the same level as an OEM ITS system.

Examples of the types of change that may be used to address these aspects are described below with reference to the ETSI CAM message. However, similar considerations would apply to modifying other message types or if a new message were to be defined associated with a new ITS application type of 'Proxy device'.

Table 8 below describes the Abstract Syntax Notation One (ASN.1) for a CAM message. ASN.1 is for example defined in ETSI ITS EN 301 637-2. This has been modified with the insertion, shown in bold, in Table 8 below.

TABLE 8

ETSI ITS 637-2, with new proxy indicator

```
CAM-PDU-Descriptions {
itu-t (0) identified-organization (4) etsi (0) itsDomain (5) wg1 (1) en
(302637) cam (2)
version (1)
}
DEFINITIONS AUTOMATIC TAGS ::=
BEGIN
IMPORTS
ItsPduHeader, CauseCode, ReferencePosition, AccelerationControl,
Curvature,
CurvatureCalculationMode, Heading, LanePosition, EmergencyPriority,
```

TABLE 8-continued

ETSI ITS 637-2, with new proxy indicator

```
EmbarkationStatus, Speed, DriveDirection, LongitudinalAcceleration,
LateralAcceleration, VerticalAcceleration, StationType, ExteriorLights,
DangerousGoodsBasic, SpecialTransportType, LightBarSirenInUse,
VehicleRole,
VehicleLength, VehicleWidth, PathHistory, RoadworksSubCauseCode,
ClosedLanes,
TrafficRule, SpeedLimit, SteeringWheelAngle, PerformanceClass,
YawRate,
ProtectedCommunicationZone, PtActivation, Latitude, Longitude,
ProtectedCommunicationZonesRSU, CenDsrcTollingZone FROM
ITS-Container {
itu-t (0) identified-organization (4) etsi (0) itsDomain (5) wg1 (1) ts
(102894) cdd (2)
version (1)
};
-- The root data frame for cooperative awareness messages
CAM ::= SEQUENCE {
    header ItsPduHeader,
    cam CoopAwareness
}
....
BasicContainer ::= SEQUENCE {
    proxyIndicator ProxyIndicator
    stationType StationType,
    referencePosition ReferencePosition,
    ...
}
BasicVehicleContainerHighFrequency ::= SEQUENCE {
    heading Heading,
    speed Speed,
    driveDirection DriveDirection,
    vehicleLength VehicleLength,
    vehicleWidth VehicleWidth,
    longitudinalAcceleration LongitudinalAcceleration,
    curvature Curvature,
    curvatureCalculationMode CurvatureCalculationMode,
    yawRate YawRate,
    accelerationControl AccelerationControl OPTIONAL,
    lanePosition LanePosition OPTIONAL,
    steeringWheelAngle SteeringWheelAngle OPTIONAL,
    lateralAcceleration LateralAcceleration OPTIONAL,
    verticalAcceleration VerticalAcceleration OPTIONAL,
    performanceClass PerformanceClass OPTIONAL,
    cenDsrcTollingZone CenDsrcTollingZone OPTIONAL
}
BasicVehicleContainerLowFrequency ::= SEQUENCE {
    vehicleRole VehicleRole,
    exteriorLights ExteriorLights,
    pathHistory PathHistory
}
.........
GenerationDeltaTime ::= INTEGER { oneMilliSec(1) } (0..65535)
END
```

In Table 8, the proxy indicator has been added to provide other ITS stations with an indication that the message comes from a proxy ITS station. The proxy indicator may be defined, for example, as described in Table 9 below.

TABLE 9

Proxy Indicator

| | |
|---|---|
| Descriptive Name | Proxy indicator |
| Identifier | DataType__ xx |
| ASN.1 representation | ProxyIndicator ::= INTEGER {Not proxy(0), Proxy(1)} |
| Definition | Indicates whether ITS Station is acting as a proxy for another user of the ITS of type stationType |
| Unit | N/A |
| Category | Other information |

In Table 9 above, stationType can for example have the values: unknown(0), pedestrian(1), cyclist(2), moped(3), motorcycle(4), passengerCar(5), bus(6), lightTruck(7), heavyTruck(8), trailer(9), specialVehicles(10), tram(11), or roadSideUnit(15).

The ITS station receiving the proxyIndicator information from Tables 8 and 9 above could use the information in a number of ways. For example, the receiving ITS station may use the proxy indicator information to populate LDMs with additional meta-data about the ITS station, specifically identifying the ITS station as a proxy. The recipient ITS station can then, for example, consider in its usage of the information, the possibility that the proxy station may only provide vehicular related V2X functionality temporarily. For example, if the driver of the vehicle stops and the passenger who owns the mobile device exits the car, the provision of V2X messages for the car may cease, even though the vehicle may continue on its journey.

Likewise, continued provision of V2X messages associated with the vehicle may be considered to be less reliable due to the possibility of the mobile device battery power dropping below a certain threshold, preventing it from continuing to operate.

Other uses for the proxyIndicator are also possible.

Generation of DENM Messages

DENM messages could similarly contain a 'proxyIndicator. For example, the indicator could be carried in the 'Management container', as for example defined in *ITS; Vehicular Communications; Basic set of applications; Part 3: Specifications of Decentralized Environmental Notification Basic Service'*, ETSI EN 302 637-3 v1.2.2 (*November 2014*).

Further, actions taken on behalf of the receiving ITS station could be similar to those described above for a CAM message.

In addition, new DENM cause codes could be added to indicate to a receiving ITS station more information about the nature and source of the triggering event.

Table 10 below provides an extract of a much larger table of cause codes from *ETSI EN 302 637-3 v1.2.2* (*November 2014*). These cause codes are carried as one of the fields in a DENM message. The cause codes in Table 10 have further been expanded to provide example new cause codes.

TABLE 10

DENM cause codes and sub-codes

| Cause code description | Direct Cause Code | Mapping with TPEG-TEC | Sub cause code | Sub cause description |
| --- | --- | --- | --- | --- |
| Dangerous Situation | 99 | Not specified in TISA TAWG11071 Values are assigned referring to ETSI TS 101 539-1, clause 6.3.4 | 0 | Unavailable |
|  |  |  | 1 | Emergency electronic brake lights |
|  |  |  | 2 | Pre-crash system activated |
|  |  |  | 3 | ESP (Electronic Stability Program) activated |
|  |  |  | 4 | ABS (Anti-lock braking system) activated |
|  |  |  | 5 | AEB (Automatic Emergency Braking) activated |
|  |  |  | 6 | Brake warning activated |
|  |  |  | 7 | Collision risk warning activated |
|  |  |  | 8 | Potential hazard predicted by proxy ITS station |

TABLE 10-continued

DENM cause codes and sub-codes

| Cause code description | Direct Cause Code | Mapping with TPEG-TEC | Sub cause code | Sub cause description |
| --- | --- | --- | --- | --- |
|  |  |  | 9 | Verbal hazard warning issued |

The sensors in a mobile device may detect a situation that could suggest danger, such as rapid deceleration. However, due to lack of integration with vehicle control systems, further detail may not be available.

Hence an additional sub-cause associated with the generic predicted 'Dangerous situation' cause could be added to indicate an unspecific potential hazard. This is shown in Table 10 as sub-cause '8': Potential hazard predicted by proxy ITS station.

Likewise another cause code, for the case where a verbal warning is issued by the driver, could be included as in Table 10 as sub-cause '9': Verbal hazard warning issued.

Other options for cause codes and sub-codes are possible.

An ITS-Station receiving one of the new cause codes could take various actions. For example, if the receiving station is travelling behind the transmitting station on the road, then receipt of the cause code could trigger the receiving vehicle to slow down or divert course.

Location Accuracy Reporting

ITS applications currently assume that location information corresponds to the center of the vehicle. ETSI ITS TS 102 894-2 Annex A defines how an ITS station can currently state its position to 95% confidence as being within an ellipse of ITS station defined dimensions. This is for example provided in fields: ReferencePosition, PosConfidenceEllipse, SemiAxisLength defined in that specification.

Figure 10:
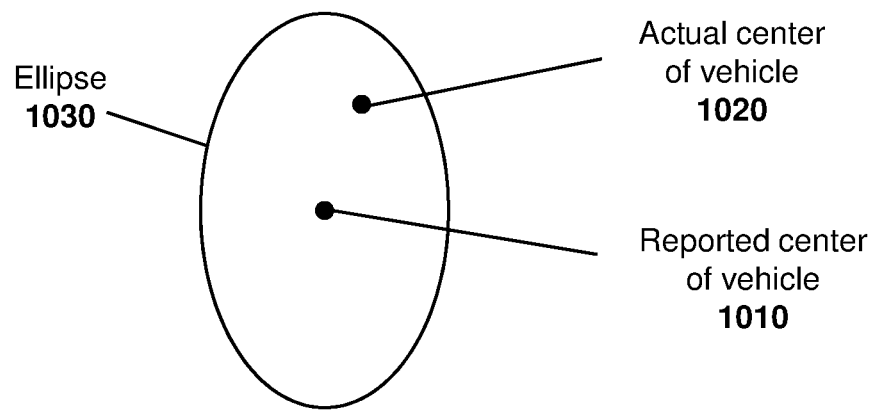
FIG. 10 is a block diagram showing a conventional location accuracy reporting mechanism.

For example, reference is now made to FIG. 10. In the embodiment of FIG. 10, the reported center of a vehicle is shown as location 1010.

In accordance with ETSI ITS TS 102 894-2 Annex A, the location 1020 of the actual center of the vehicle is within ellipse 1030 with a 95% degree of confidence.

However, for a proxy ITS station, this device could be anywhere in the vehicle. In this regard, it is difficult for the proxy ITS station to identify the center of a vehicle. Thus, when a mobile device acts as a proxy, accuracy settings for location of the device could be set differently to the conventional method of FIG. 10.

Figure 11:
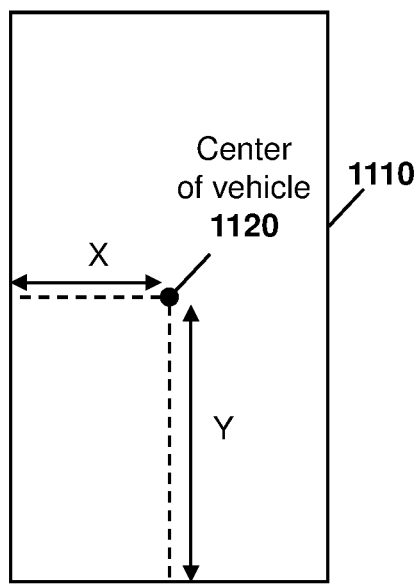
FIG. 11 is a block diagram showing a modified location accuracy reporting mechanism.

When a location of a mobile device within the vehicle cabin is unknown, positional uncertainty needs to be increased. An example of how this might be achieved for a rectangular shaped cabin or vehicle is shown with reference to FIG. 11.

A vehicle or vehicle cabin 1110 has a width of 2X and a length of 2Y, assuming a rectangular cabin or vehicle. Thus, for every point within the ellipse that describes mobile device location uncertainty, the location 1120 of the actual center of the vehicle could be anywhere within an additional area of ±X, ±Y from that point within the ellipse.

Based on this uncertainty, optionally new information elements describing X, Y, or even more complex shapes describing cabin and trunk or boot areas could be supplied by the Proxy V2X ITS station to enable the recipient ITS station to determine positional uncertainty.

For example the DF_ReferencePosition in '*ITS Users and application requirements, Part 2: Applications and facilities layer common data dictionary*', ETSI TS 102 894-2 v1.2.1

(2014 September), can be modified, for an approximately rectangular shaped cabin, in accordance with the bold indications in Table 11 below.

TABLE 11

| ETSI TS 102 894-2 modified with Cabin Dimensions | |
|---|---|
| Descriptive Name | ReferencePosition |
| Identifier | DataType_ 124 |
| ASN.1 representation | ReferencePosition ::= SEQUENCE { |
| | latitude Latitude, |
| | longitude Longitude, |
| | positionConfidenceEllipse |
| | PosConfidenceEllipse , |
| | cabinWidthDimension |
| | cabinLengthDimension |
| | altitude Altitude |
| | } |
| Definition | The geographical position of a |
| position or of an ITS-S. It represents a geographicalpoint position. | |
| The DF shall include the following information: | |
| ● ☐latitude: latitude of the geographical point; it shall be presented as specified in clause A.41 Latitude, | |
| ● longitude: longitude of the geographical point; it shall be presented as specified in clause A.44 Longitude, | |
| ● positionConfidenceEllipse: accuracy of the geographical position; it shall be presented as specified in clause A.119 PosConfidenceEllipse, | |
| ● altitude: altitude and altitude accuracy of the geographical point; it shall be presented as specified in clause A.103 Altitude. | |
| The DF may optionally include: | |
| ● cabinWidthDimension | |
| ● cabinLengthDimension | |
| The optional parameters are sent when a proxy ITS station (portable device) is used, and its location within the car is unknown. | |

Based on Table 11 above, the cabin width and length could for example be provided as part of the location accuracy.

The modules and mobile devices described above may be any computing device or network node. Such computing device or network node may include any type of electronic device, including but not limited to, mobile devices such as smartphones or cellular telephones. Examples can further include fixed or mobile user equipments, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Figure 12:
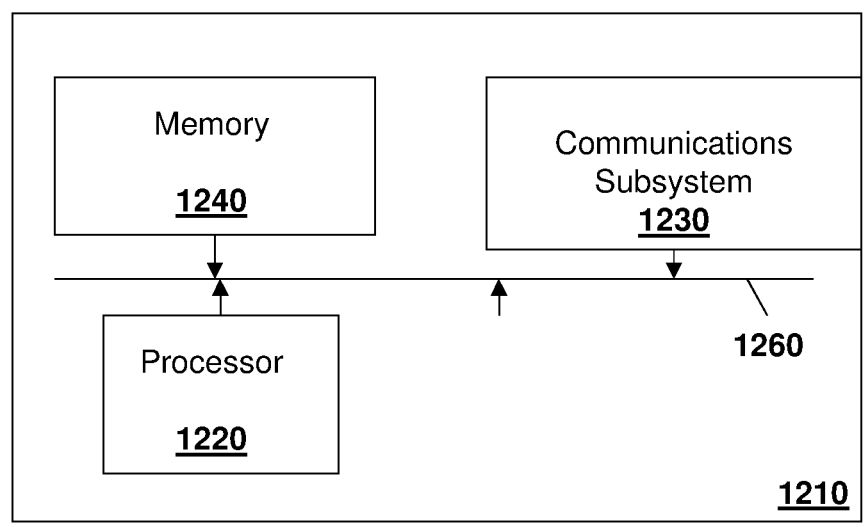
FIG. 12 is a block diagram of an example computing device capable of being used with the embodiments of the present disclosure.

One simplified diagram of a computing device is shown with regard to FIG. 12. The computing device of FIG. 12 could be any mobile device, portable device, ITS station, server, or other node as described above.

In FIG. 12, device 1210 includes a processor 1220 and a communications subsystem 1230, where the processor 1220 and communications subsystem 1230 cooperate to perform the methods of the embodiments described above. Communications subsystem 1220 may, in some embodiments, comprise multiple subsystems, for example for different radio technologies.

Processor 1220 is configured to execute programmable logic, which may be stored, along with data, on device 1210, and shown in the example of FIG. 12 as memory 1240.

Memory 1240 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1240, device 1210 may access data or programmable logic from an external storage medium, for example through communications subsystem 1230.

Communications subsystem 1230 allows device 1210 to communicate with other devices or network elements and may vary based on the type of communication being performed. Further, communications subsystem 1230 may comprise a plurality of communications technologies, including any wired or wireless communications technology.

Communications between the various elements of device 1210 may be through an internal bus 1260 in one embodiment. However, other forms of communication are possible.

The computing device of FIG. 12 could be any mobile device, ITS augmented navigation aid, standalone or portable ITS device, among other options. If the computing device is a mobile device, one example mobile device is described below with regard to FIG. 13.

Mobile device 1300 may comprise a two-way wireless communication device having voice or data communication capabilities or both. Mobile device 1300 generally has the capability to communicate with other computer systems. Depending on the exact functionality provided, the mobile device may be referred to as a data messaging device, a two-way pager, a wireless e-mail device, a smartphone, a cellular telephone with data messaging capabilities, a wireless Internet appliance, a wireless device, a mobile device, an embedded cellular modem or a data communication device, as examples.

Where mobile device 1300 is enabled for two-way communication, it may incorporate a communication subsystem 1311, including a receiver 1312 and a transmitter 1314, as well as associated components such as one or more antenna elements 1316 and 1318, local oscillators (LOs) 1313, and a processing module such as a digital signal processor (DSP) 1320. As will be apparent to those skilled in the field of communications, the particular design of the communication subsystem 1311 will be dependent upon the communication network in which the mobile device is intended to operate.

Network access requirements will also vary depending upon the type of network 1319. In some networks, network access is associated with a subscriber or user of the mobile device 1300. A mobile device may require an embedded or a removable user identity module (RUIM) or a subscriber identity module (SIM) card or a UMTS SIM (USIM) in order to operate on a network. The USIM/SIM/RUIM interface 1344 is normally similar to a card-slot into which a USIM/SIM/RUIM card can be inserted and ejected. The USIM/SIM/RUIM card can have memory and hold many key configurations 1351, and other information 1353 such as identification, and subscriber related information. In other cases, rather than a network 1319, mobile device 1300 may communicate with a non-access node, such as a vehicle, roadside infrastructure, another mobile device, or other peer-to-peer communication.

Figure 13:
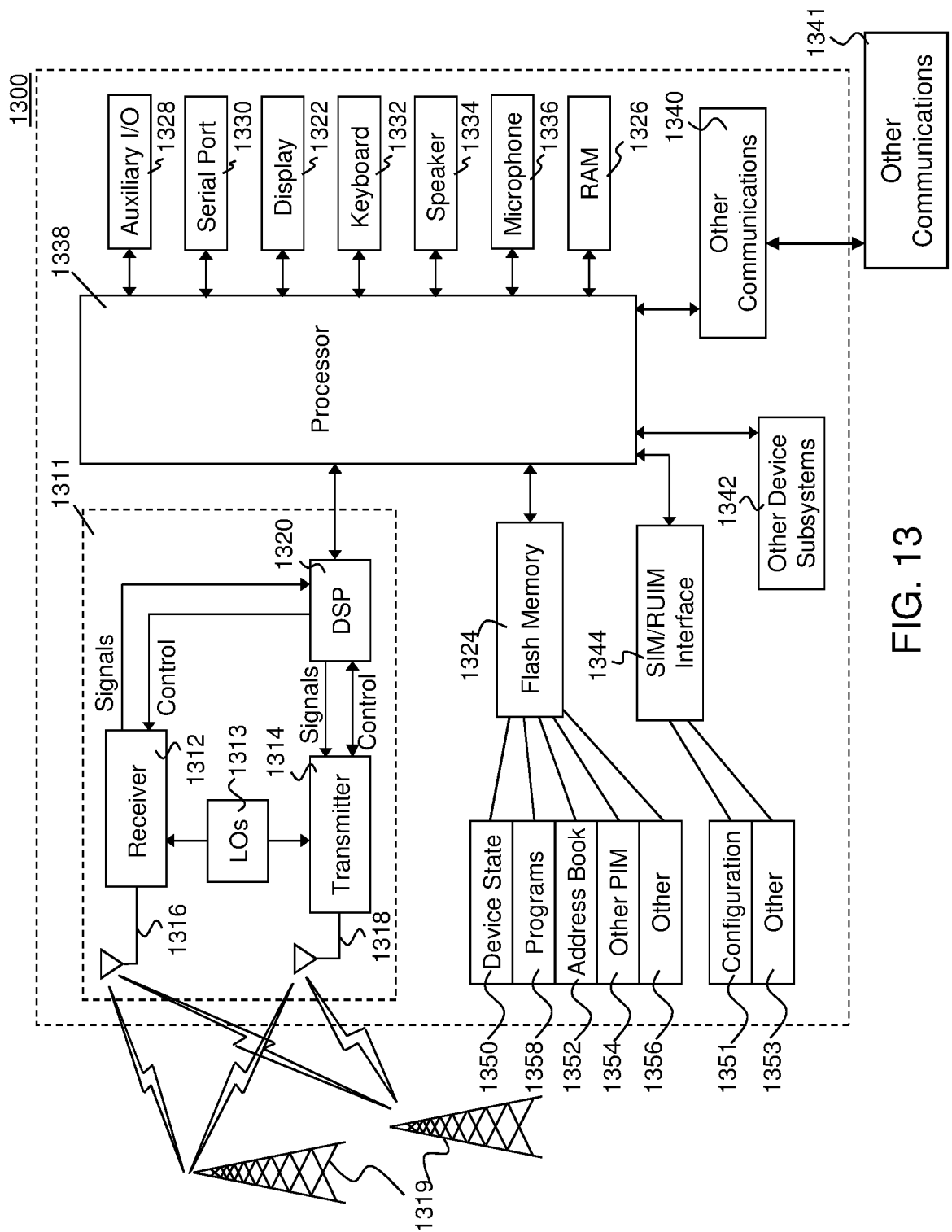
FIG. 13 is a block diagram of an example mobile device capable of being used with the embodiments of the present disclosure.

When required network registration or activation procedures have been completed, mobile device 1300 may send and receive communication signals over the network 1319. As illustrated in FIG. 13, network 1319 can include multiple base stations communicating with the mobile device.

Signals received by antenna 1316 through communication network 1319 are input to receiver 1312, which may perform such common receiver functions as signal amplification, frequency down conversion, filtering, channel selection and the like. Analog to digital (A/D) conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog (D/A) conversion, frequency up conversion, filtering, amplification and transmission over the communication network 1319 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320.

Mobile device 1300 generally includes a processor 1338 which controls the overall operation of the device. Communication functions, including data and voice communications, are performed through communication subsystem 1311. Processor 1338 also interacts with further device subsystems such as the display 1322, flash memory 1324, random access memory (RAM) 1326, auxiliary input/output (I/O) subsystems 1328, serial port 1330, one or more keyboards or keypads 1332, speaker 1334, microphone 1336, other communication subsystem 1340 such as a short-range communications subsystem, DSRC subsystem 3GPP based V2X subsystem, or cellular subsystem, and any other device subsystems generally designated as 1342. Serial port 1330 could include a USB port, On-Board Diagnostics (OBD) port or other port known to those in the art.

Some of the subsystems shown in FIG. 13 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the processor 1338 may be stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Processor 1338, in addition to its operating system functions, may enable execution of software applications on the mobile device. A predetermined set of applications that control basic operations, including potentially data and voice communication applications for example, will normally be installed on mobile device 1300 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, messages, calendar events, voice mails, appointments, and task items. Further applications, including productivity applications, social media applications, games, among others, may also be loaded onto the mobile device 1300 through the network 1319, an auxiliary I/O subsystem 1328, serial port 1330, short-range communications subsystem 1340 or any other suitable subsystem 1342, and installed by a user in the RAM 1326 or a non-volatile store (not shown) for execution by the processor 1338. Such flexibility in application installation increases the functionality of the device and may provide enhanced on-device functions, communication-related functions, or both.

In one embodiment, mobile device 1300 may have an ITS application for pedestrian safety. For example, such application may be used when a mobile device user is walking, bicycling or otherwise using an ITS system outside of a vehicle.

Also, mobile device 1300 may have an ITS application for use as a proxy for vehicle ITS functionality, as described above. In some embodiments, the application for pedestrian ITS functionality may be the same application for proxy ITS functionality.

Certificates on the mobile device 1300 that are used for securing V2X communications may be used either when the device is acting as a pedestrian ITS station or when the device is acting as a vehicular ITS station.

In a data communication mode, a received signal such as a text message or web page download will be processed by the communication subsystem 1311 and input to the processor 1338, which may further process the received signal for output to the display 1322, or alternatively to an auxiliary I/O device 1328.

A user of mobile device 1300 may also compose data items such as messages for example, using the keyboard 1332, which may be a complete alphanumeric keyboard or telephone-type keypad, either physical or virtual, among others, in conjunction with the display 1322 and possibly an auxiliary I/O device 1328. Such composed items may then be transmitted over a communication network through the communication subsystem 1311.

Where voice communications are provided, overall operation of mobile device 1300 is similar, except that received signals may typically be output to a speaker 1334 and signals for transmission may be generated by a microphone 1336. Alternative voice or audio I/O subsystems, such as a voice message recording subsystem, may also be implemented on mobile device 1300. Although voice or audio signal output is preferably accomplished primarily through the speaker 1334, display 1322 may also be used to provide an indication of the identity of a calling party, the duration of a voice call, or other voice call related information for example.

Serial port 1330 in FIG. 13 may be implemented in a mobile device for which synchronization with a user's desktop computer (not shown) may be desirable, but is an optional device component. Such a port 1330 may enable a user to set preferences through an external device or software application and may extend the capabilities of mobile device 1300 by providing for information or software downloads to mobile device 1300 other than through a wireless communication network. As will be appreciated by those skilled in the art, serial port 1330 can further be used to connect the mobile device to a computer to act as a modem or for charging a battery on the mobile device.

Other communications subsystems 1340, such as a short-range communications subsystem, is a further component which may provide for communication between mobile device 1300 and different systems or devices, which need not necessarily be similar devices. For example, the subsystem 1340 may include an infrared device and associated circuits and components or a Bluetooth™ or Bluetooth™ Low Energy communication module to provide for communication with similarly enabled systems and devices. Subsystem 1340 may further include a wake-up radio. Subsystem 1340 may further include a DSRC radio or similar V2X radio, a 3GPP cellular V2X radio, or other similar radio. Subsystem 1340 may further include non-cellular communications such as Wi-Fi or WiMAX, or near field communications.

In a further embodiment, other communications subsystem 1341 may be an external device, dongle or other similar device, which may use a short-range wired or wireless connection to mobile device 1300 to provide for communication between mobile device 1300 and different systems or devices. For example, other communications subsystem 1341 may comprise a peripheral device or dongle. Subsystem 1341 may include an infrared device and associated circuits and components or a Bluetooth™ or Bluetooth™ Low Energy communication module to provide for communication with similarly enabled systems and devices. Subsystem 1341 may further include a wake-up radio. Subsystem 1341 may further include a DSRC radio or similar V2X radio, a 3GPP cellular V2X radio, or other similar radio. Subsystem 1341 may further include non-cellular communications such as Wi-Fi or WiMAX, or near field communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a mobile device for the mobile device to act as an intelligent transportation system (ITS) station for a vehicle, the method comprising:
    detecting that the mobile device is inside, on, or attached to the vehicle;
    determining that ITS messages are not being sent on behalf of the vehicle by any of the vehicle and a second computing device, wherein the vehicle has no equipment for V2X capability, and wherein the determining comprising determining, by the mobile device, that the vehicle lacks the equipment for V2X capability; and
    when the determining finds ITS messages are not being sent on behalf of the vehicle, the mobile device acting as the ITS station for the vehicle.

2. The method of claim 1, wherein the detecting uses sensors within the mobile device to determine whether at least one of an acceleration of the mobile device, a location of the mobile device, or a speed of the mobile device are consistent with the computing device being inside, on, or attached to a vehicle.

3. The method of claim 1, wherein the detecting uses a short range wired or wireless connection to the vehicle to detect the mobile device is inside, on, or attached to the vehicle.

4. The method of claim 1, wherein the detecting uses a bar code or a quick response code to detect the mobile device is in the vehicle.

5. The method of claim 1, wherein the determining is based on a local dynamic map within the mobile device having information about the vehicle.

6. The method of claim 1, wherein the determining is based on sensing ITS communications from the vehicle or from another device.

7. The method of claim 1, wherein the determining is based on information conveyed between the mobile device and a communication capable entity for the vehicle.

8. The method of claim 7, wherein, for the determining, the information provides a uniform resource locator (URL) to permit the mobile device to find information about whether the vehicle supports integrated ITS functionality.

9. The method of claim 7, wherein the information conveyed between the mobile device and the communication capable entity is from an infotainment system of the vehicle, and wherein the information indicates at least one of whether the vehicle supports ITS communications and whether another device is acting as an ITS station on behalf of the vehicle.

10. The method of claim 1, further comprising adding an indication to outgoing ITS communications from the mobile device that the ITS communication is a communication on behalf of the vehicle.

11. The method of claim 1, further comprising:
    obtaining information about an alert at the mobile device; and
    conveying the alert through a connection between the mobile device and an infotainment system of the vehicle.

12. The method of claim 1, further comprising:
    receiving an alert from an infotainment system of the vehicle; and
    conveying the alert from the mobile device in an ITS communication.

13. The method of claim 12, wherein the information about the alert is an audio stream, and wherein the mobile device further performs a speech to text conversion on the audio stream.

14. The method of claim 1, further comprising adding an indication of vehicle or vehicle cabin dimensions to outgoing ITS communications from the mobile device.

15. The method of claim 1, wherein the determining whether ITS messages are not being sent on behalf of the vehicle includes determining whether the vehicle is sending ITS messages or whether another device is sending messages on behalf of the vehicle.

16. The method of claim 1, further comprising:
    determining that the mobile device is no longer inside, on, or attached to the vehicle; and
    switching from the mobile device acting on behalf of the vehicle to acting on behalf of a pedestrian.

17. A mobile device configured to act as an intelligent transportation system (ITS) station for a vehicle, the mobile device comprising:
    a processor; and
    a communications subsystem, wherein the mobile device is configured to:
    detect that the mobile device is inside, on, or attached to the vehicle;
    determine that ITS messages are not being sent on behalf of the vehicle by any of the vehicle and a second computing device, wherein the vehicle has no equipment for V2X capability, and wherein the determining comprising determining, by the mobile device, that the vehicle lacks the equipment for V2X capability; and
    when the determining finds ITS messages are not being sent on behalf of the vehicle, the mobile device being configured to act as the ITS station for the vehicle.

18. A non-transitory computer readable medium for storing instruction code for a mobile device to act as an intelligent transportation system (ITS) station for a vehicle, the instruction code, when executed by a processor of the mobile device, causing the mobile device to:
    detect that the mobile device is inside, on, or attached to the vehicle;
    determine that ITS messages are not being sent on behalf of the vehicle by any of the vehicle and a second computing device, wherein the vehicle has no equipment for V2X capability, and wherein the determining comprising determining, by the mobile device, that the vehicle lacks the equipment for V2X capability; and when the determining finds ITS messages are not being sent on behalf of the vehicle, the mobile device being configured to act as the ITS station for the vehicle.

* * * * *